(12) United States Patent
Ehara et al.

(10) Patent No.: US 6,333,755 B1
(45) Date of Patent: Dec. 25, 2001

(54) ELECTROPHOTOGRAPHIC APPARATUS

(75) Inventors: Toshiyuki Ehara, Yokohama; Masaya Kawada; Hironori Ohwaki, both of Mishima, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,343

(22) Filed: Sep. 5, 2000

(30) Foreign Application Priority Data

Sep. 6, 1999 (JP) .................................................. 11-251417

(51) Int. Cl.[7] .............................. B41J 2/385; G03G 13/04
(52) U.S. Cl. ............................................. 347/129; 347/131
(58) Field of Search .................................. 347/129, 131, 347/135, 240, 246, 251, 253, 254

(56) References Cited

U.S. PATENT DOCUMENTS

| | | | |
|---|---|---|---|
| 4,217,555 | 8/1980 | Iwamatsu | 330/267 |
| 4,409,311 | 10/1983 | Kawamura et al. | 430/95 |
| 4,607,936 | 8/1986 | Miyakawa et al. | |
| 4,650,736 | 3/1987 | Saitoh et al. | 430/57 |
| 4,659,639 | 4/1987 | Mizuno et al. | 430/65 |
| 4,705,733 | 11/1987 | Saitoh et al. | 430/57 |
| 4,788,120 | 11/1988 | Shirai et al. | 430/66 |
| 4,797,327 | 1/1989 | Honda et al. | 428/600 |
| 4,952,978 | 8/1990 | Ueda et al. | |
| 5,101,159 | 3/1992 | Bossard et al. | 324/456 |
| 5,268,709 | * 12/1993 | Saito et al. | 347/131 |
| 5,689,768 | 11/1997 | Ehara et al. | 399/96 |
| 5,732,313 | 3/1998 | Kawada et al. | 399/174 |
| 5,983,043 | 11/1999 | Ohwaki et al. | 399/48 |
| 6,219,076 | * 4/2001 | Sato | 347/131 |

FOREIGN PATENT DOCUMENTS

| | | |
|---|---|---|
| 0 131 125 | 1/1985 | (EP) . |
| 42-27021 | 12/1942 | (JP) . |
| 54-83746 | 7/1979 | (JP) . |
| 57-11556 | 1/1982 | (JP) . |
| 60-35059 | 2/1985 | (JP) . |
| 60-67951 | 4/1985 | (JP) . |
| 60-95551 | 5/1985 | (JP) . |
| 60-168156 | 8/1985 | (JP) . |
| 60-178457 | 9/1985 | (JP) . |
| 60-225854 | 11/1985 | (JP) . |
| 61-231561 | 10/1986 | (JP) . |
| 62-168161 | 7/1987 | (JP) . |
| 5-508708 | 12/1993 | (JP) . |
| 8-314265 | 11/1996 | (JP) . |
| 9-43934 | 2/1997 | (JP) . |
| 11-183542 | 7/1999 | (JP) . |

* cited by examiner

*Primary Examiner*—Susan S. Y. Lee
(74) *Attorney, Agent, or Firm*—Fitzpatrick, Cella, Harper & Scinto

(57) ABSTRACT

An electrophotographic apparatus includes a photosensitive body and electrostatic image forming device for forming an electrostatic image on the photosensitive body. The electrostatic image forming device includes an exposing device for exposing the photosensitive body by a digital light in accordance with image information. The exposing device exposes a portion that is a background for an image. A developing device develops the electrostatic image using a developer, wherein a rate throughout the developer of the contained particles have a diameter equal to or smaller than 1 $\mu$m is 5 to 40 number %, and wherein, when A denotes a one-pixel width and Wv denotes a width at half value of a peak in a potential distribution of the electrostatic image formed by exposing the photosensitive drum using the digital light of one pixel, $0.6 \leq Wv/A \leq 1.0$ is satisfied.

18 Claims, 18 Drawing Sheets

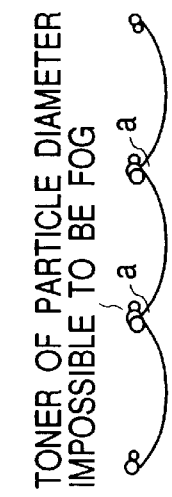

FIG. 1D

| | SEPARATION PROPERTY CLN PROPERTY | FOG |
|---|---|---|
| FIG. 1A | FAIL | GOOD |
| FIG. 1B | GOOD | GOOD |
| FIG. 1C | GOOD | FAIL |

SEPARATION PROPERTY:
SEPARATION PROPERTY OF
TRANSFER MATERIAL FROM
PHOTOSENSITIVE BODY
CLN PROPERTY:
CLEANING PROPERTY OF
PHOTOSENSITIVE BODY

FIG. 1A
NO FOG TONER

FIG. 1B
TONER OF PARTICLE DIAMETER IMPOSSIBLE TO BE FOG

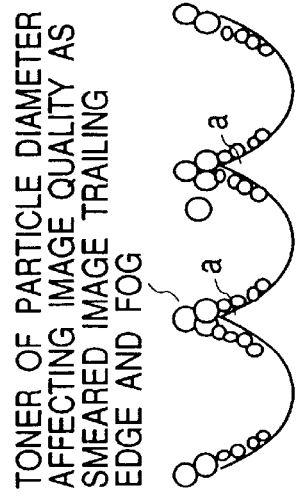

FIG. 1C
TONER OF PARTICLE DIAMETER AFFECTING IMAGE QUALITY AS SMEARED IMAGE TRAILING EDGE AND FOG a: POTENTIAL PORTION OF BORDER AREA BETWEEN PIXELS

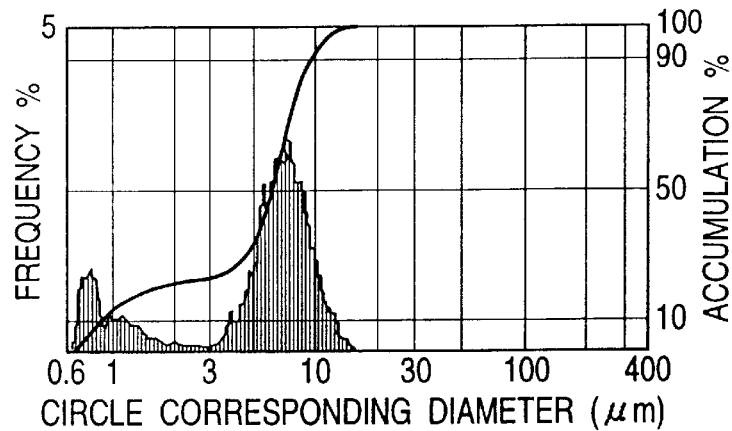
FIG. 2A   GRANULARITY DISTRIBUTION (NUMBER STANDARD)
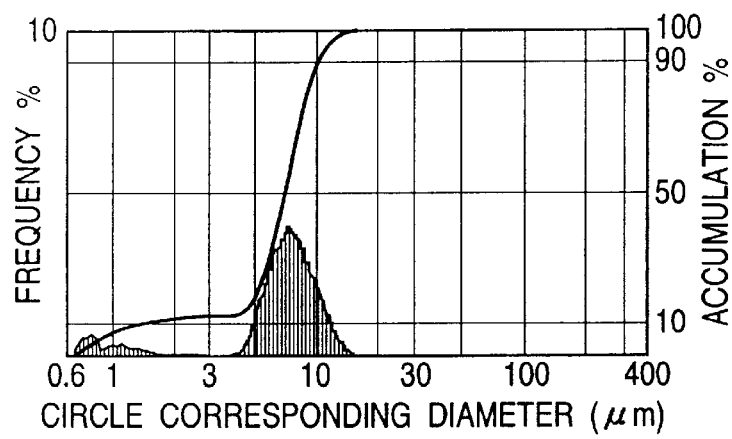
FIG. 2B   GRANULARITY DISTRIBUTION (NUMBER STANDARD)
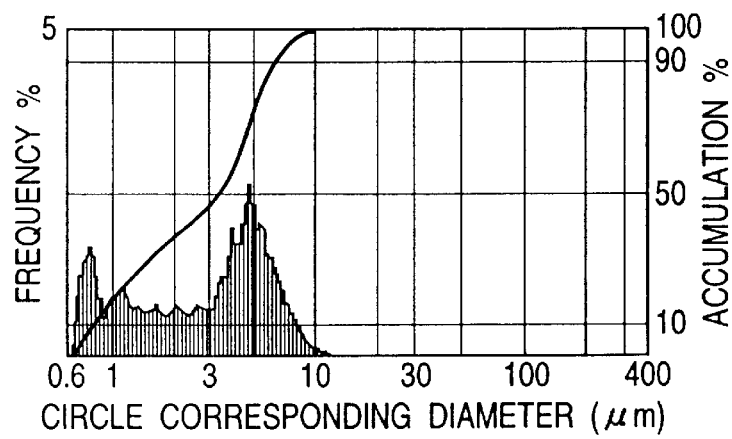
FIG. 2C   GRANULARITY DISTRIBUTION (NUMBER STANDARD)

JUDGING STANDARD ;
EXCELLENT : VERY GOOD, GOOD, FAIR : NO PROBLEM ON PRACTICAL USE,
FAIL : PROBLEM ON PRACTICAL USE

JUDGING STANDARD;
EXCELLENT: VERY GOOD, GOOD, FAIR: NO PROBLEM ON PRACTICAL USE,
FAIL: PROBLEM ON PRACTICAL USE

ELECTROPHOTOGRAPHIC APPARATUS

BACKGROUND OF THE INVENTION

1. Field of the Invention

The present invention relates to an electrophotographic apparatus, such as a printer, a copier or a facsimile machine, and relates in particular to an electrophotographic apparatus that includes exposure means for exposing a photosensitive body to digital light.

2. Description of the Related Background Art

Electrophotographic printers have been drawing attention because of the features, such as high image quality and high printing speeds, that they provide.

FIG. 21 is a diagram illustrating the schematic arrangement of an electrophotographic printer that employs light beams for scanning and for exposing.

An organic or inorganic electrophotographic photosensitive body 1, a rotating drum, is a recording medium, and is rotated clockwise, as indicated by an arrow, at a predetermined peripheral speed.

Charging means 2 is a corona charging device or a contact charging roller, for example, that uses a predetermined polarity and potential to uniformly charge the external surface of the rotating photosensitive body 1.

An optical scanning apparatus 3 is a laser scanner or an LED array apparatus (a light-emitting device array apparatus), for example, that serves as image forming light irradiation means. When a light beam L is modulated and is output, in consonance with image information, by the optical scanning apparatus 3, it is used to scan and expose the charged face of the rotating photosensitive body 1. Thereafter, on the portion of the bright face of the photosensitive body 1 that is exposed the potential is decayed, and due to the potential contrast subsequently established by the potential on the dark exposed portion, an electrostatic latent image is formed on the face of the photosensitive body in consonance with the image information pattern that is scanned and exposed.

Development means 4 uses a developer (toner) to develop normally or to develop reversely the latent electrostatic image on the photosensitive body 1 and to visualize it as a toner image.

Transfer means 5 is a transfer corona charging device or a transfer roller, for example. A transfer material (a recording medium) P is fed by a paper feeding mechanism (not shown) to a transfer portion between the transfer means and the photosensitive body 1 in consonance with a predetermined control timing. The transfer material P is conveyed while attached to the face of the photosensitive body 1, while concurrently the toner image on the photosensitive body 1 is transferred to the face of the transfer material P.

Once the transfer material P has passed through the transfer portion it is separated from the photosensitive body 1 and is fed into fixing means 7, wherein, the toner image is subjected to a fixing process and the transfer material P is printed out.

After the transfer material P has been separated from the photosensitive body 1, residual toner is removed from the face of the body 1 by cleaning means 6, such as a blade or a fur brush, and the cleaned face of the photosensitive body 1 is again employed for image formation.

The main light sources for the image forming light irradiation means 3 are a laser and an LED. The procedure performed to scan the photosensitive body 1, which is a recording medium, greatly affects printer performance, including the quality of the images it provides and the printing speed. Mainly, an LED is employed for processing involving the use of a spatial installation and electric scanning combination, while a laser is employed for processing involving the use of an optical scanning and electric scanning combination.

Further, while taking the relationship between image information and an exposure portion into account, roughly two image forming methods are available for use with a digital electrophotographic apparatus.

One method is an image exposure method (hereinafter referred to as the IAE method) according to which an image portion is exposed, and the other method is a background exposure method (hereinafter referred to as the BAE method) according to which a non-image portion (the background) is exposed.

The BAE method is the same as the image forming method used for an analog electrophotographic apparatus, and as an advantage provides that development and cleaning properties and a developer can be used in common by an analog electrophotographic apparatus.

On the other hand, according to the IAE method, to obtain an image, reversal-developing using a developer having the opposite polarity must normally be performed.

In practice, both methods are used, but their use tends to be determined by the operating limitations imposed by the photosensitive body and the developer that are employed.

Various development methods, including one-component development and two-component brush development, have been proposed or adapted for use with the development means 4 in accordance with the needs for specific processing, such as monochromatic printing or color printing. Generally, the image reproduction property of two-component brush development is superior to that of one-component development. These methods possess unique properties.

The following is a listing of the properties possessed by the primary developing methods.

a) BMT method and FEED method
  one-component, insulating, magnetic, contact
  the FEED method especially has substantially the same image characteristics as the two-component brush development.
b) touch-down method
  one-component, insulating, nonmagnetic, contact
  the occurrence of fog due to contact development is a problem.
c) jumping method
  one-component, insulating, magnetic, noncontact
  because of noncontact, fog and scratches seldom occur.
d) projection method
  one-component, insulating, nonmagnetic, noncontact
  because of noncontact, fog and scratches seldom occur, and because this method is nonmagnetic, color printing is available.
e) magnedynamic method
  one-component, conductive, magnetic, contact
  induced charging using a latent image electric field, brush development
  either a positive or a negative latent image can be developed, but image transfer is difficult.
f) IMB method
  two-component, insulating, nonmagnetic, contact since an insulating carrier is employed, electric charges of the opposite polarity are accumulated after image development.

reproduction of solid image portions is not especially notable, but reproduction of fine lines is superior.

g) CMB method two-component, conductive, nonmagnetic, contact since a conductive carrier is employed, electric charges of the opposite polarity are not accumulated after image development.

reproduction of solid image portions is superior, but reproduction of fine lines at a low density is not especially notable.

The transfer and separation performances are greatly affected by the transfer efficiency and the separation/re-transfer latitude. Since in the IAE method the potential of the non-image portion (the background) is higher than the potential of the image portion, the latitude for the BAE method is greater than that for the IAE method.

Further, since the potential of the photosensitive body has decayed by the time cleaning is initiated, according to the IAE method for the development of an image on a low potential portion, much developer tends to remain attached to the photosensitive body at the cleaning position, and as for the cleaning property, the latitude for the BAE method is also greater than that for the IAE method.

As is apparent from the above explanation, the BAE method is easier to design, and has the potential of providing a stable electrophotographic apparatus for which the latitude is large.

However, for image recording for which a light beam is used for scanning, the latitude for the BAE method is less than the latitude for the IAE method, as will be described below.

Specifically, according to the image recording technique for which light beam scanning is used, the size, the shape and strength of a light beam spot greatly affect image quality and stabilization. Especially with an electrophotographic apparatus, since the uniform surface potential distribution that is obtained on the face of a photosensitive body by charging is selectively decayed by irradiation with a light beam, the size and the shape of the light beam spot affects the distribution.

According to the IAE method, the surface potential of a photosensitive body is decayed by exposing the image area (solid black portion) to a light beam, and the developer is attached to the portion whereat the potential has been reduced. Therefore, when a half value width Wv (F.W.H.M.; Full Width at Half Maximum) of a latent image potential distribution is increased relative to the pixel width, the line width of a character or a line is increased to print the character or the line as a solid color.

According to the BAE method, surface potential is decayed by exposing the background (nonblack portion) of a photosensitive body to a light beam, and the area whereat the developer is to be attached is an area for which the potential has not decayed, i.e., where the surface potential is high. Therefore, when the half value width of the latent image potential distribution is increased relative to the pixel width, the line width of a character or a line is reduced and the color of the character or the line is faded.

Therefore, for these image forming methods, there is an upper limit for the spot diameter and strength of a light beam.

In FIG. 22, the state of one line in accordance with the IAE method, i.e., the light beam ON state for only one line, is shown on the left, and the state of one line in accordance with the BAE method, i.e., the light beam OFF state for only one line, is shown on the right. The latitude for the IAE method is VD–Vi, and the latitude for the BAE method is Vb–V2.

As is apparent from FIG. 22, in accordance with the BAE method, if the spot diameter is too small or the strength of the light beam is insufficient relative to the scanning interval, a potential gap is generated in the light beam irradiated portion, and V2 is increased while the latitude is reduced. Thus, there also is a lower limit for the spot diameter and the strength of the light beam relative to the scanning interval in other words, it is well known that the latitude for the BAE method is smaller than the latitude for the IAE method.

Therefore, an optimal spot diameter and light beam strength must be set for the individual image forming methods.

FIG. 23 is a graph showing the relationship between the distribution of the energy of a light beam, the photosensitive characteristic of a photosensitive body, and the potential distribution on a photosensitive body. As is apparent from FIG. 23, when the photosensitive characteristic of the photosensitive body is linear, the energy distribution of the light beam is directly reflected by the potential distribution on the photosensitive body.

In electrophotography, the step whereat the transferring material P that has passed through the fixing portion is separated from the face of the photosensitive body 1 mainly employs electrostatics, machines, or the curvature of the photosensitive body 1 and the effect of gravity on the transfer material P. In either case, the transfer material P can be easily separated when the adhesive force between the transferring material P and the photosensitive body 1 is small. This greatly depends on the sealing condition at the portion whereat the transfer material P contacts the photosensitive body 1. The adhesive force is especially increased for a smoother transfer material P, such as an OHP sheet, rather than a fiber material, such as paper.

To improve the above shortcoming, it is effective for appropriate toner fogging to occur on the face of the photosensitive body 1.

Further, as for the cleaning means 6, the step whereat the surface of the photosensitive body 1 is cleaned by the cleaning blade is initiated when the blade closely contacts the surface of the photosensitive body 1 and smoothly slides across the surface.

That is, when the blade is pressed against the surface of the photosensitive body 1 too tightly, the friction between the two parts is increased and may be sufficient to cause great damage to the photosensitive body and the blade, or to warp the blade. And when the blade slides too smoothly and freely along the surface of the photosensitive body 1, the surface will be inadequately cleaned.

Specifically, for the conventional setting of the cleaning property, when the efficiency of the transfer of an image from the face of the photosensitive body 1 to the transfer material P is increased, when the time (idling time) is extended for cleaning the photosensitive body 1 without the developing process being performed, or when images, such as solid blank images, for which only a small amount of toner is required are continued, several defects appear: the blade contacts the surface of the photosensitive body 1 too closely and is warped, or a cleaning failure occurs.

Therefore, in order to satisfactorily continue the blade cleaning process, appropriate fogging is required on the face of the photosensitive body 1.

At the step for cleaning the surface of the photosensitive body 1 using a fur brush, when there is no fogging across the entire face of the photosensitive body 1, the fur brush strikes the hard surface of the photosensitive body 1 directly, and this adverse procedure may be accompanied by the deterioration of the fur brush. Therefore, in this case also, it is effective for appropriate fogging to be present on the face of the photosensitive body 1.

However, while i) when the fogging on the face of the photosensitive body 1 attains a constant level, as is described above, the separation of the transfer material P from the photosensitive body 1 and the cleaning of the photosensitive body 1 are improved, ii) it is demanded that the fogging be reduced as much as possible to maintain high image quality and to reduce the consumption of toner. Thus, an increase in the latitude is requested.

SUMMARY OF THE INVENTION

To respond to the above request, it is one objective of the present invention to provide an electrophotographic apparatus that can increase the setting range within which properties i) and ii), which are traded off against each other, can be established, and that has a large design latitude and provides a high overall performance.

BRIEF DESCRIPTION OF THE DRAWINGS

FIGS. 1A, 1B, 1C and 1D are diagrams showing an image according to the present invention;

FIGS. 2A, 2B and 2C are graphs showing the granularity distributions of a developer according to experiment 1;

DETAILED DESCRIPTION OF THE PREFERRED EMBODIMENTS

Figure 3A:
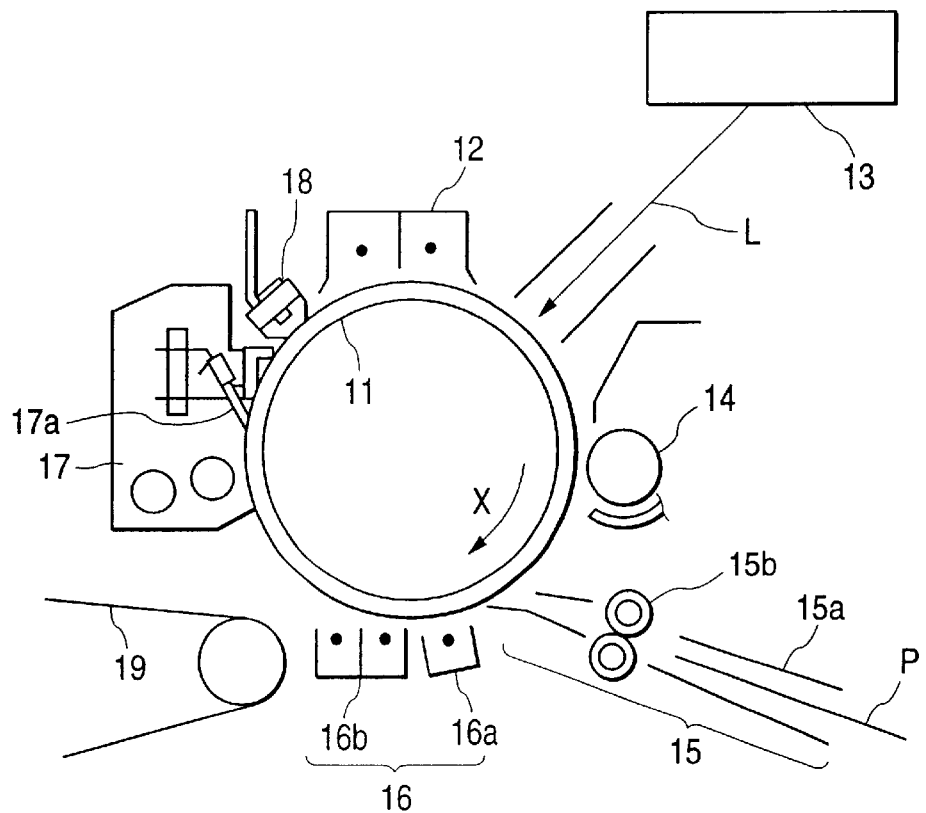
FIGS. 3A and 3B are schematic diagrams showing the arrangement of a printer according to experiment 2.

Before the explanation of the preferred embodiments of the present invention is given, the operations of the present invention will be described.

Through careful study, the present inventors found that a developer (toner) can be roughly sorted into:

(1) a developer having a particle diameter that seldom causes fogging;

(2) a developer having a particle diameter that affects the image quality by causing a smeared image trailing edge or fogging; and (3) a developer having a particle diameter that contributes to normal developing.

The present inventors also found that (4) since, depending on an outward additive or a developing condition, a developer having a small particle diameter can provide greater triboelectricity than a developer having with a particle diameter that contributes to the normal developing, the operability for developing an electrostatic latent image can be changed.

The present invention is based on this discovery. The BAE method is employed for an electrophotographic apparatus, and the half value width Wv of the latent image potential distribution is reduced relative to the interval between pixels, and a potential gap is formed at the border area between pixels. Further, the containing ratio of a developer having a particle diameter that seldom causes fogging is increased, and high triboelectricity is applied to selectively develop an image. Thus, a developing condition (fogging) that does not adversely affect image quality and the consumption of toner is provided.

Specifically, a potential gap is formed at the border area between pixels, and a developer having a particle diameter that seldom causes fogging is selectively attached. Thus, without increasing the fogging that affects toner consumption and image quality, the separation from the photosensitive body property of the transfer material and/or the cleaning property of the photosensitive body, and/or the life of the cleaning blade or the fur brush can be improved.

This image is shown in FIGS. 1A to 1D.

In FIG. 1A, there is no substantial fogging. In this case, as is shown in FIG. 1D, fogging that adversely affects the image quality is not present, but the separation from the photosensitive body property of the transferring material and the cleaning property of the photosensitive body are not good.

In FIG. 1B, a toner having a particle diameter that will seldom cause fogging that affects image quality is present. In this case, as is shown in FIG. 1D, both cleaning and fogging are established. That is, while the fogging that affects toner consumption and image quality is not increased, the separation of the transferring material from the photosensitive body and/or the cleaning property of the photosensitive body, and/or the life of the cleaning blade or the fur brush can be improved.

In FIG. 1C, a toner having a particle diameter that affects the image quality by causing a smeared image trailing edge or a fogged image is present. In this case, as is shown in FIG. 1D, the separation property and the cleaning property are good, but naturally fogging occurs that affects image quality Since an electrostatic latent image is examined while the latent image potential distribution is measured using a method described in Japanese Patent Application Laid-Open No. 11-183542, it is confirmed that the above described phenomenon is not caused by a shape factor.

One specific mode is an electrophotographic apparatus that radiates a light beam for irradiating individual pixels of a pixel matrix consisting of a plurality of rows and a plurality of columns, and that forms an image using the BAE method. As the characteristics of this electrophotographic apparatus, when A denotes a one-pixel width and Wv denotes a width at the half value of the peak in the latent image potential distribution that is formed during the irradiation of one pixel using the light beam, the relationship $0.6 \leq Wv/A \leq 1.0$ is established. Further, the photosensitive body includes a photosensitive layer containing amorphous silicon, and the containing ratio of a developer having a particle diameter that is equal to or smaller than 1 $\mu$m to the overall developer is 5 to 40 number %.

Since a black area is formed by light exposure in accordance with the BAE method, the potential between pixels at the border area it not lowered enough. Thus, when a developer having a particle diameter that contributes to normal developing is employed, fogging that affects the image quality occurs, and when the exposure with light having an increased beam diameter overlaps too much, the line width is reduced. If the EV property (the potential property for the optical energy; the horizontal axis represents the optical energy (E) and the vertical axis represents the potential (V)) of a photosensitive layer is linear, as for a-Si, the potential gap of the light beam irradiation portion, whereat the developer having a particle diameter that seldom causes fogging is developed, can be precisely controlled, and the above described mode can be implemented.

When the EV property is linear, a sharp image can be maintained, even though the beam diameter is increased.

It is preferable that the containing rate (ratio) of the developer having a particle diameter of 1 to 3 $\mu$m be 2 to 30%. When for such a developer the containing ratio is less than 2%, the density of the toner particles that are developed is low, and a smeared image trailing edge tends to occur. And when the containing ratio for the above developer exceeds 30%, fogging is increased in a solid white image.

With the above described arrangement, the fogging that affects toner consumption and image quality is not increased, and the latitude can be expanded.

Since a potential gap is defined at the border area between pixels by defining the above described "5 to 40 number %", and the developer particles having a diameter that seldom causes fogging are selectively developed, fogging that affects toner consumption and image quality is not increased. Further, the separation property and/or the cleaning property, and/or the life of the fur brush can be improved.

Furthermore, when the one-pixel width on the surface of the photosensitive body is equal to or smaller than 80 $\mu$m, the above effects are more apparent. And when the average particle diameter of the developer is 4 to 13 $\mu$m and the containing ratio of the developer having the particle diameter 1 to 3 $\mu$m to the overall developer is 2 to 30 number %, the fogging, the resolution and the smeared Image trailing edge are enhanced more.

More specifically, since a blank area is formed by light exposure in accordance with the BAE method, fogging appears when the potential at the portion whereat the laser beam overlaps is not lowered enough, while the line width is reduced when the light beam overlaps too much while the beam diameter is increased.

As for the a-Si photosensitive layer, since no optical energy dependency appears for the potential change of a-Si having the linear EV property relative to the optical energy change, a sharp image can be maintained even when the beam diameter is increased.

While fogging tends to appear when the beam diameter is reduced, the relationship is substantially linear. Therefore, when the beam diameter and a developing bias are appropriately controlled, an electrophotographic apparatus that does not cause fogging (a fraction is not dispersed) and has an excellent cleaning property (an external additive is dispersed) can be obtained.

When the half value width of the latent image potential is large relative to the pixel width, the line width is narrowed and fogging is improved. The cleaning property is improved when the amount of fogging becomes equal to or greater than a constant quantity, and this depends on the toner particle diameter and the outward additive (the particle diameter and the quantity). The latitude where this relationship has been established is greater for the a-Si photosensitive layer than for the OPC photosensitive layer.

In accordance with this relationship, a preferable combination is "BAE method"+"$0.6 \leq Wv/A \leq 1.0$"+"a-Si"+"the above described toner (particle diameter and quantity)".

Therefore, in the electrophotographic apparatus that employs the a-Si having the linear EV property and that projects the light beam onto each pixel of a pixel matrix consisting of multiple rows and multiple columns, and that forms an image using the BAE method, the relationship "$0.6 \leq Wv/A \leq 1.01$" is established between the one-pixel width A and the width Wv of a latent image, which is formed by projecting a light beam onto one pixel. Further, since the containing ratio of the developer having a particle diameter of 1 $\mu$m to the overall developer is 5 to 40 number %, the potential gap is defined at the border area between the pixels, and the containing ratio of the developer having a particle diameter that seldom causes fogging is increased, and these developer particles are selectively developed by the application of high triboelectricity. Thus, the development state (fogging) that does not adversely affect toner consumption can be formed, so that while fogging that affects toner consumption and image quality is not increased, the separation property, the cleaning property and the life of the fur brush can be improved. These relationships are frequently traded off, and the setting range within which these relationships are established is conventionally limited. However, according to the present invention, the electrophotographic apparatus can be implemented that has a large design latitude and a high total performance, and the method therefor.

In addition, since the width of one pixel on the surface of the photosensitive body is set equal to or smaller than 80 $\mu$m, the above effects are more remarkable. And when the average particle diameter of the developer is set to 4 to 13 $\mu$m and the containing ratio of the developer having the particle diameter 1 to 3 $\mu$m to the overall developer is set to 2 to 30 number %, the fogging, the resolution and the smeared image trailing edge can be improved.

In Japanese Patent Application Laid-Open No. 8-314265, a fogged toner image is formed on a photosensitive body to provide spacer effects. According to this publication, the objective is to provide an image forming apparatus, having an automatic double-sided printing function, that prevents a fixing oil from being transferred to the photosensitive body via a transferring belt or the like, so that the objective differs from that of the present invention. Further, there is no specific description regarding the use by the fogged toner forming means of particles having the same polarity as the toner.

Experiments for explaining the effects of the present invention will now be described.

<Experiment 1> (FIGS. 2A to 2C)

This experiment relates to the control probability for the particle distribution of a developer.

styrene-butyl acrylate-butyl maleate half ester copolymer 100 units magnetic powder 100 units iron complex of monoazo dye 2 units low-molecular weight polyethylene 4 units were mixed using a blender, and the mixture was melted and kneaded by using two-axle extruder that was heated to 130° C. The cooled mixture was roughly pulverized using a hammer mill, and then the roughly pulverized material was ground in a pulverizer, such as a jet mill, using a jet stream.

The obtained powder was strictly classified by a multiple fraction classifier using the Coanda effect, and toner particles were thus obtained.

1.2 units of dry silica, for which the hydrophobic process was performed using silicone oil and hexamethyldisilazan, was added to the 100 units of the obtained toner particles, and they were mixed in a mixer to prepare a toner.

The results obtained by measuring the particle distribution of the toner are shown in FIG. 2A. The circle corresponding to the diameter was 6 $\mu$m, and one peak was present in an area equal to or smaller than 1 $\mu$m and in an area of 3 to 10 $\mu$m. Further, about 10 number % of particles having a diameter of 1 to 3 $\mu$m were present.

A flow particle image analytical instrument FPIA-1000 manufactured by Toa medical Co., Ltd. was employed to measure the particle distribution.

As a specific measurement method, 0.1 to 0.5 ml of a surface active agent, preferably alkylbenzene sulfonate, was added as a dispersing agent to 100 to 150 ml of water, in a container, from which solid impurities were removed in advance. Further, 0.1 to 0.5 g of a measurement sample was added. A dispersion process was performed for the suspension whereby the sample was dispersed using an ultrasonic dispersing device for one to three minutes, and with a dispersion density of 3000 to 10000 number/$\mu$l, the particles of the developer were measured using the above instrument.

Furthermore, the pulverization pressure (air pressure) of the pulverizer that employs the jet stream and the feeding volume (the feeding quantity per unit hour, i.e., kg/hour) were adjusted, and/or the airflow rate of the multiple fraction classifier and the position of the division plate were adjusted, and/or the classification step was repeated multiple times. The results obtained by preparing the developer having different particle distributions are shown in FIGS. 2B and 2C.

It is apparent that the containing ratios of the particles having a diameter of 3 to 10 $\mu$m, a diameter of 1 $\mu$m or smaller, and a diameter of 1 to 3 $\mu$m can be controlled.

<Experiment 2> (FIGS. 3A and 3B through 9A and 9B)

This experiment concerns the "Wv/A".

Figure 3B:
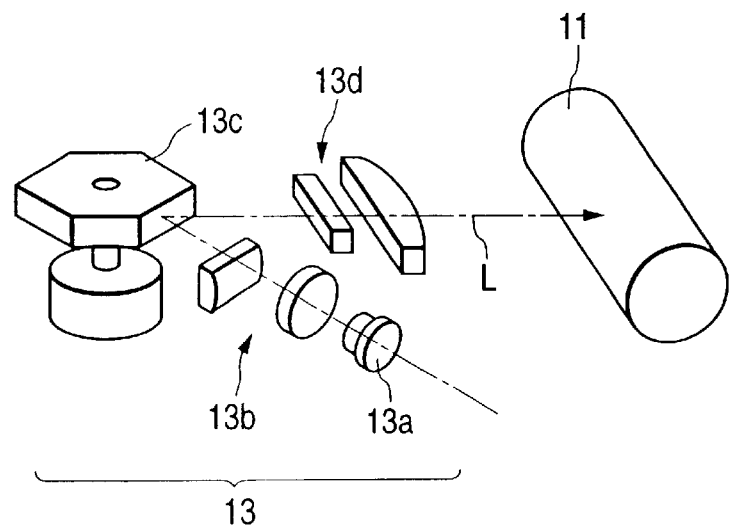

FIG. 3A is a schematic diagram illustrating the essential portion of an electrophotographic apparatus used for this experiment. The electrophotographic apparatus for this experiment is a BAE method laser printer of the reversal development and transfer type (an analog Canon copier NP6750 was improved to obtain a digital copier that includes an optical scanning device). FIG. 3B is a diagram showing the arrangement of the optical scanning device (laser scanner).

A cylindrical (drum) electrophotographic photosensitive body 11 was rotated clockwise at a predetermined peripheral speed, as indicated by an arrow X. A main charging device 12, an optical scanning device 13, a developing device 14, a transfer material feeding system 15, a transfer and separation charging device 16, a cleaning device (cleaner) 17, a main charge elimination light source 18, and a conveying system 19 are located near and adjacent to the photosensitive body 11.

The photosensitive body 11 was uniformly charged to predetermined polarity and potential by the main charging device 12, and the optical scanning device 13 irradiated (scanned and exposed) the charged face using a light beam (image forming beam) L carrying document information Then, an electrostatic latent image corresponding to the exposure pattern was formed on the photosensitive body 11. when toner was supplied from the developing device 14, the latent image became a visible image, i.e., a toner image.

The transferring material P was passed through the transfer material feeding system 15, which included a transfer material path 15a and registration rollers 15b, and was supplied to a gap defined between the photosensitive body 11 and a transferring charging device 16a at a predetermined control timing. At the gap between the transferring charging device 16a and the photosensitive body 11, an electric field having a polarity opposite to that of the toner was applied from the rear, so that the toner image on the surface of the photosensitive body 11 was transferred to the transferring material P. Then, at a separation charging device 16b, the transfer material P was separated from the photosensitive body 11 by charge elimination, was transported by the transfer material conveying system 19, and was discharged to the exterior at a fixing device (not shown).

The toner that was not used for the transferring process at the transferring portion and that remained on the surface of photosensitive body 11 was delivered to the cleaning device 17 and was removed from the surface of the photosensitive body 11 by a cleaning blade 17a. The photosensitive body 11 that was cleaned received charge elimination light from the main charge elimination light source 18, and memory was electrically erased, so that the photosensitive body 11 was again available for the next image forming process.

The optical scanning device 13, a laser scanner, as is shown in FIG. 3B, included: a laser diode 13a, a rotary polygon mirror 13c and an optical system 13b, for introducing a laser beam emitted by the laser diode 13a to the rotary polygon mirror 13c; and an optical scanning system 13d, for introducing, into the photosensitive body 11, a laser beam L that was deflected by the rotary polygon mirror 13c and for scanning and exposing the photosensitive body 11 using the laser beam L.

Figure 4:
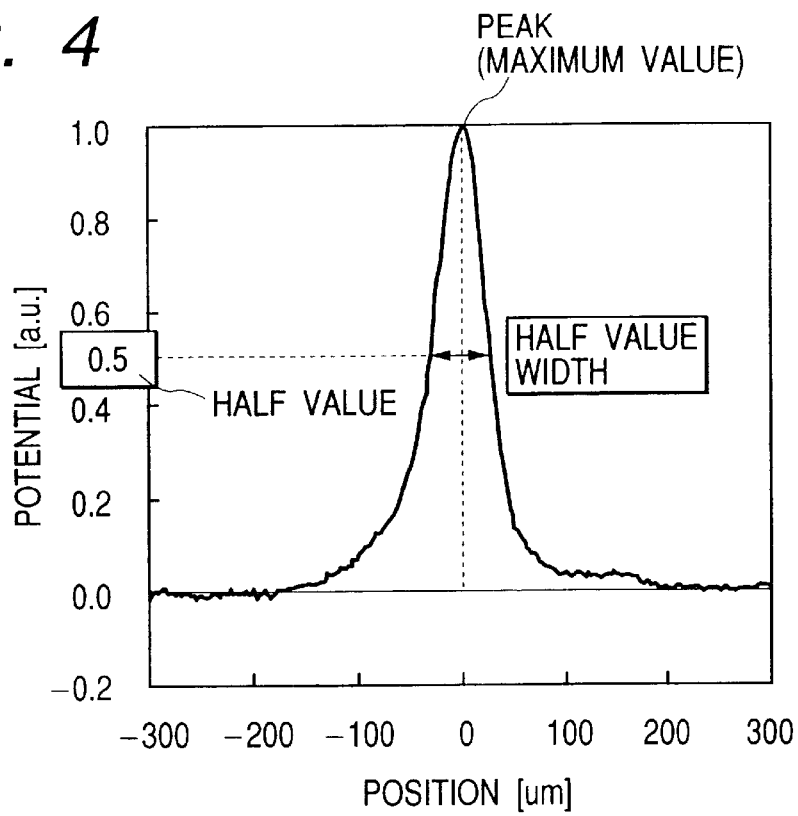
FIG. 4 is a graph showing example results that are obtained when an electrostatic latent image for one dot (the light beam irradiation OFF state for only one dot) was formed using the BAE method and the latent image distribution was measured, and that represent the definition of the latent image width.

For the thus arranged printer, the a-Si photosensitive body was employed for the photosensitive body 11, and an electrostatic latent image of one dot (i.e., no light beam irradiation was performed for only one dot) was formed using the BAE method. The results obtained by measuring the electrostatic latent image distribution are shown in FIG. 4.

Figure 5:
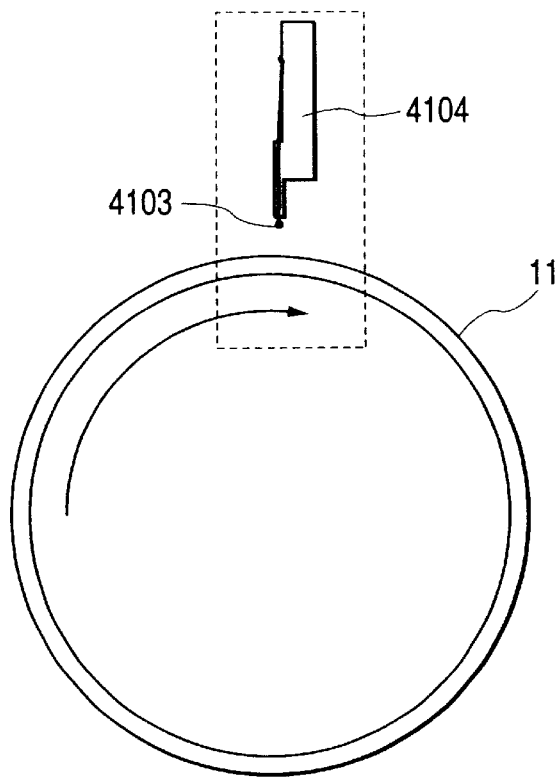
FIG. 5 is a specific diagram showing an example latent image distribution measurement method.
Figure 6:
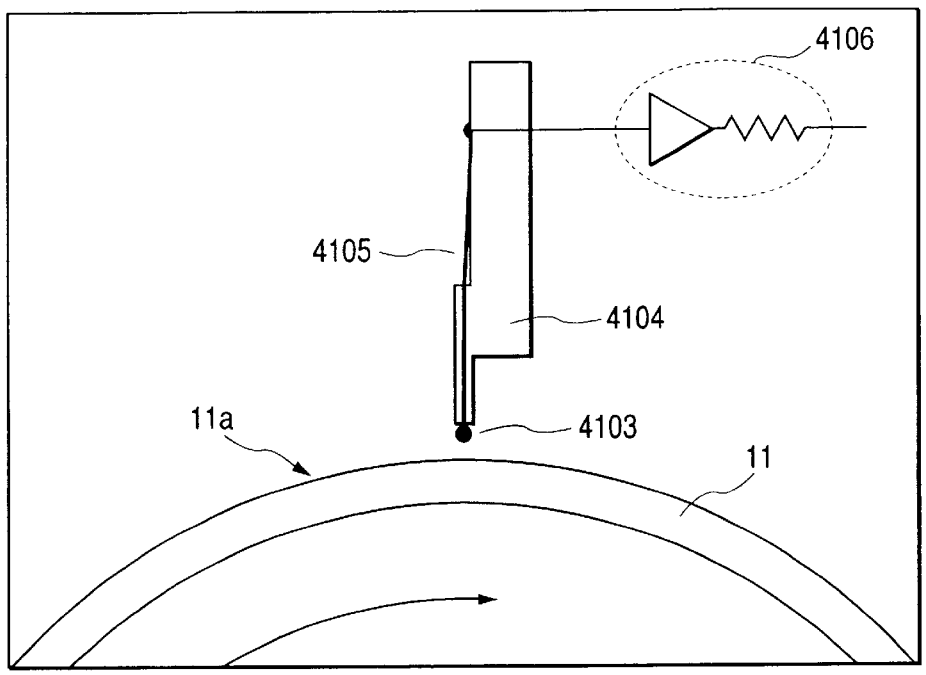
FIG. 6 is a specific, partial enlargement of the diagram in FIG. 5, showing an example arrangement for a potential sensor for measuring the latent image distribution.
Figure 7:
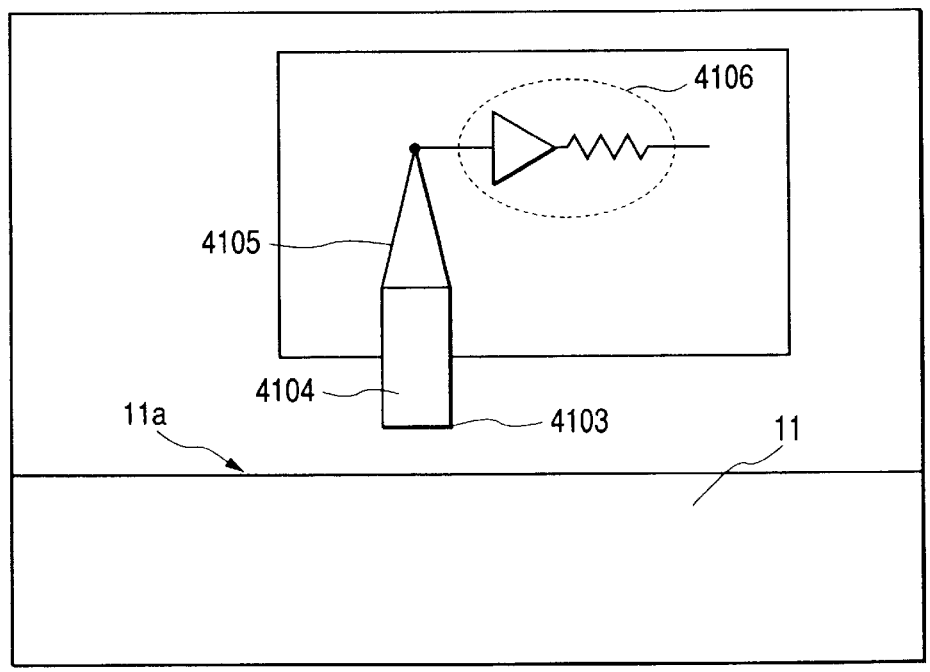
FIG. 7 is a specific diagram showing an example arrangement of the potential sensor in FIG. 6 for measuring the latent image distribution, as viewed from the left side of the paper.

For this measurement, the method disclosed in Japanese Patent Application Laid-Open No. 11-183542 was employed whereby a detection electrode is used to electrically measure the latent image distribution (hereinafter referred to as a latent image distribution method). FIGS. 5 to 7 are specific diagrams showing the outline of the latent image distribution method. The photosensitive body 11 includes a surface 11a that accompanies a potential change. A potential sensor 4103 is supported by a support member 4014 and is connected to a circuit element 4106 by a conducting line 4105. FIG. 6 is a partially enlarged diagram for FIG. 5, and FIG. 7 is a schematic diagram for FIG. 6 viewed from the left of the paper.

When the surface 11a on which the latent image was formed was relatively shifted away from the potential sensor 4103, an induced current that was proportional to $$dV/dt=(dV/dx) \cdot (dx/dt)$$

dV: a change value of the surface potential dx/dt: relative moving velocity was detected by the potential sensor 4103.

Generally, since the relative velocity of movement was constant, the detected induced current included information concerning the inclination of the surface potential. The latent image potential distribution could thus be measured by analyzing the included information.

In addition to this method, several other methods have been reported, as in Japanese Patent Application Laid-Open No. 5-508708; for example, a method whereby a latent image was visualized using the means employing a developer and was evaluated to obtain an estimate of the latent image distribution before the image was visualized, and a method for electrically estimating the above described potential change on the surface of the photosensitive body. The same effects can be naturally obtained by using these methods.

Figure 8:
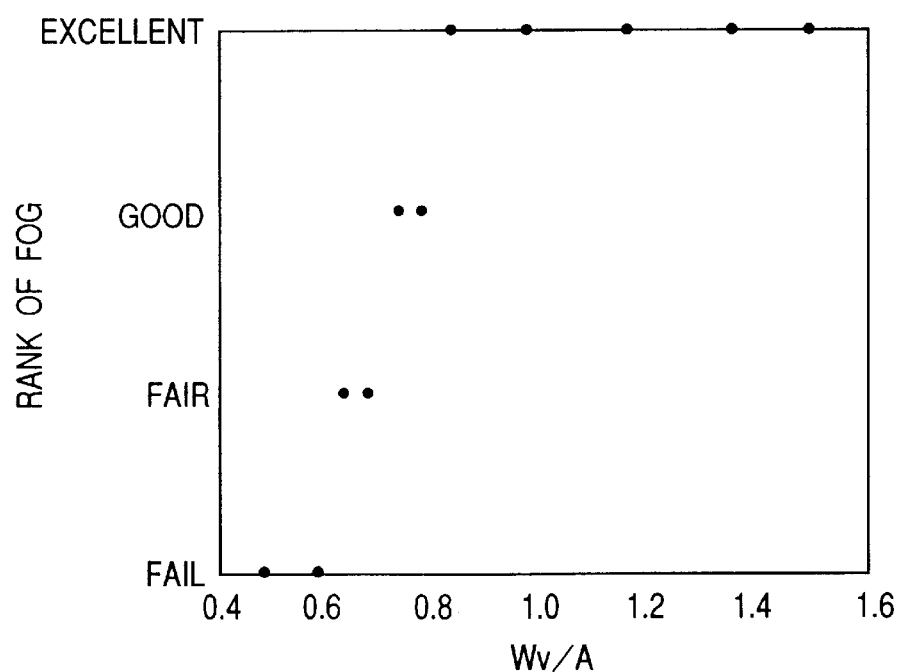
FIG. 8 is a graph showing fogging relative to a ratio Wv/A for a latent image width Wv to a one-pixel width A.
Figure 9A:
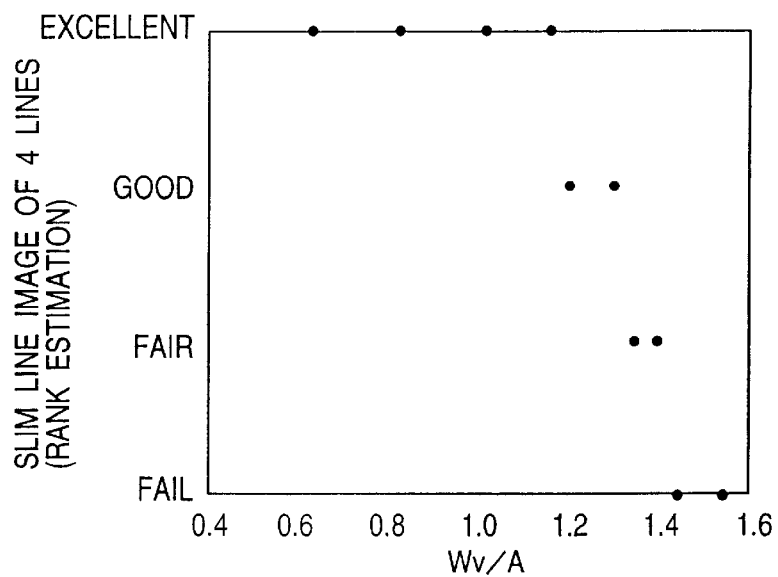
FIGS. 9A and 9B are graphs showing a line width and a slim line image relative to the ratio Wv/A of the latent image width Wv to the pixel width A, with FIG. 9A showing the slim line image of a four-line width and FIG. 9B showing the slim line image of the one-dot diameter.
Figure 9B:
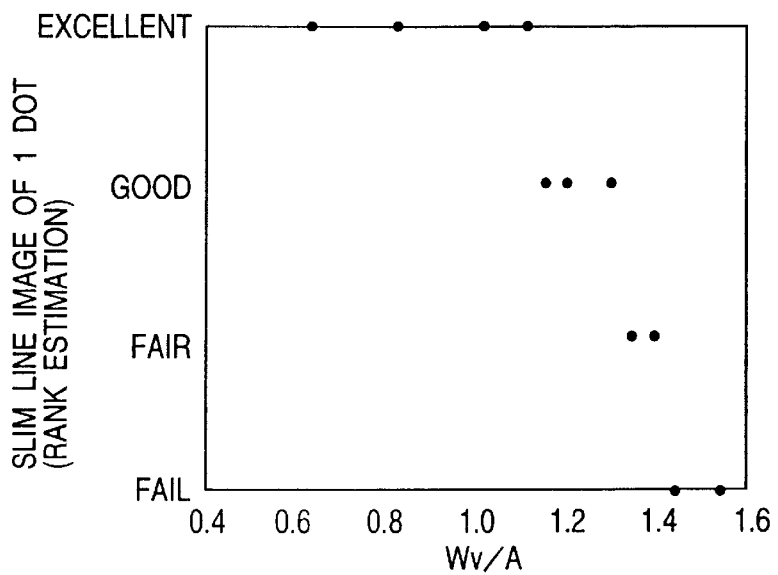

In FIG. 4 the measurement results obtained by the above described latent image distribution measurement method are shown; the horizontal axis represents the position of the latent image on the photosensitive body, and the vertical axis represents the potential of the latent image. As is shown in FIG. 4, when the half value width (F.W.H.M.) at the one-dot latent image distribution was defined as a latent image width Wv, the rank of the fogging in a solid white image was examined while the ratio of the latent image width Wv to the one-pixel width (the design value of the image forming mechanism) A was changed. The obtained results are shown in FIG. 8. Further, the relationship between the ratio Wv/A and the slim line image of a line and the relationship between the ratio Wv/A and the slim line image of a dot were examined, and their results are shown in FIGS. 9A and 9B.

As is apparent from FIG. 8, when the ratio Wv/A was reduced, the fogging was increased and the rank was reduced. It was estimated that the latent image width Wv was reduced relative to the one-pixel width A, and the potential gap became remarkable. It was also found that a preferable ratio Wv/A was slightly greater than 0.6 relative to the fogging.

An image output when a 4-line latent image and a 1-dot latent image were formed was examined using the method for evaluating the slim line image relative to the design values (respectively corresponding to the one-pixel width×4 and the one-pixel width). The results obtained for the slim line image of four lines are shown in FIG. 9A, and the results obtained for the slim line image of one dot are shown in FIG. 9B. The horizontal axis represents the ratio of the latent image width Wv to the one-pixel width A, and the vertical axis represents the slim line image rank for each design value. As is apparent from the graphs for the four-line latent image and the one-line latent image, when the ratio Wv/A was increased, i.e., the latent image width Wv was increased, the line width and the dot diameter became smaller than the design values, and their ranks were lowered. As a result of the experiments, it was found that a Wv/A ratio of smaller than 1.4 is preferable for the slim line images of the line and the dot.

Figure 10A:
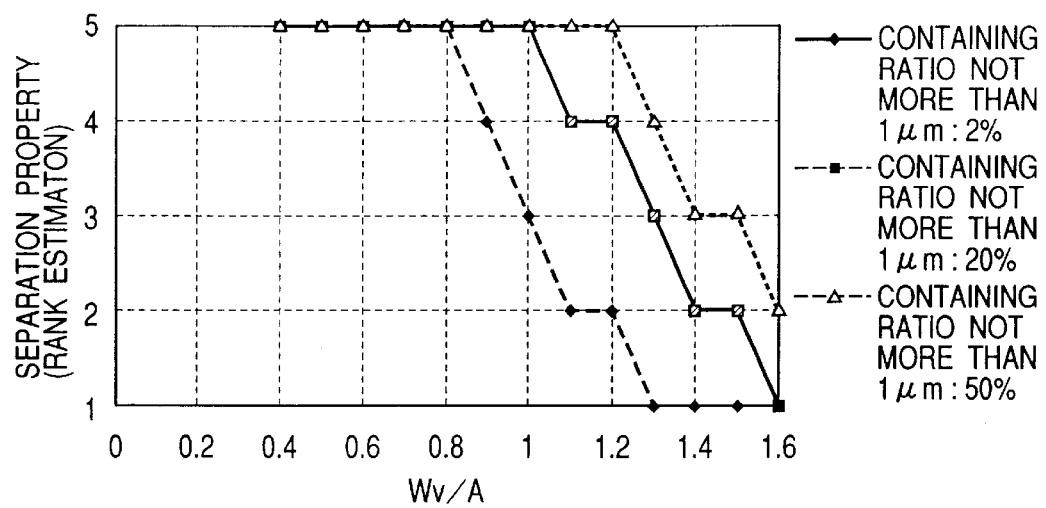
FIGS. 10A and 10B are property graphs for experiment 3, with FIG. 10A being a graph showing the separation property at the ratio Wv/A of the latent image width Wv to the pixel width A, and FIG. 10B being the cleaning and developing properties for the containing ratio that is equal to or smaller than 1 $\mu$m.
Figure 10B:
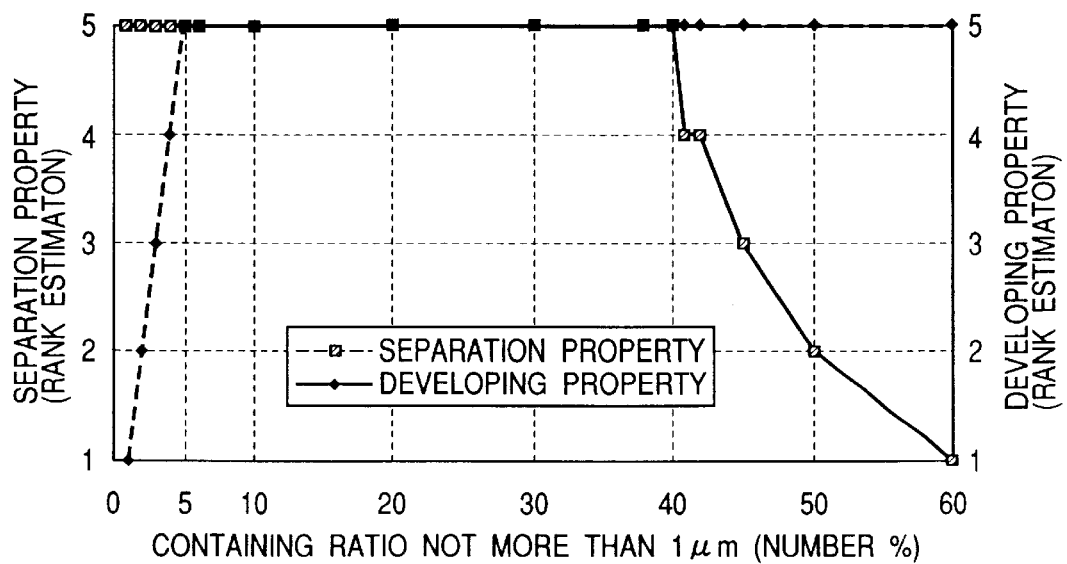

<Experiment 3> (FIGS. 10A and 10B)

This experiment employed a cleanerless (CLNless) printer.

The printer used for this experiment was so designed that the corona charging device, as the main charging device, of the printer (FIGS. 3A and 3B) used for experiment 2 was replaced with a contact charging member, as described in Japanese Patent Application Laid-Open No. 9-43934, and that the transfer/separation charging device 16 was replaced with a transferring roller, while the cleaning device 17 was removed. The remainder of the structure of the printer was the same as that used for experiment 2.

While the cleanerless printer was employed, the is separation from the photosensitive body 11 property of the transfer material P was evaluated by changing the ratio of the latent image width Wv to the one-pixel width A.

Further, the particle distribution was changed in the same manner as in experiment 1 to obtain a developer wherein particles having a diameter of 1 μm were contained at a different ratio (number %) relative to the overall developer. The separation from the photosensitive body 11 property of the transfer material P was evaluated, and the obtained results are shown in FIGS. 10A and 10B.

Relative to the separation property, a case wherein the transfer material P, during its transportation to the transfer material conveying system 19 of the printer, was attracted to the photosensitive body 11 and was temporarily raised from the conveying system 19 was defined as NG, and the ratio to OK during the continuous operation was estimated by using five ranks (5 is excellent) for the a separation property.

While the design values were employed as the potential settings for the dark and bright portions of the electrostatic latent image, a solid black density of φ5 mm was estimated by using five ranks (5 is excellent) for the development property, while also taking into account environmental dependency and endurance.

It is apparent that remarkable separation effects were obtained when the ratio Wv/A was small, and that the preferable Wv/A was equal to or smaller than 1.0. Further, it is apparent that the separation property was good when the developer was employed wherein particles having a diameter of 1 μm or smaller were contained at the a ratio equal to or greater than 5 number% relative to the overall developer.

In addition, it is apparent that the development property was good when particles having a diameter of 1 μm or smaller were contained in the throughout the developer at the ratio equal to or smaller than 40 number % relative to the overall developer.

As a result, it is apparent that, as a preferable arrangement, throughout the developer particles having a diameter of 1μ or smaller should be present at a ratio of 5 to 40 number % and that the ratio Wv/A be equal to or smaller than 1.0.

Figure 11A:
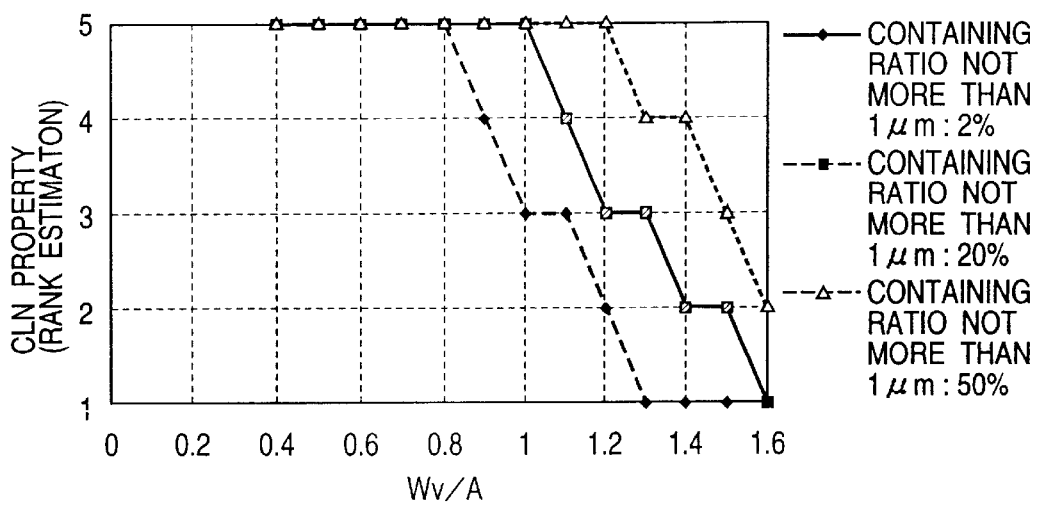
FIGS. 11A and 11B are property graphs for experiment 4, with FIG. 11A being a graph showing the separation property at the ratio Wv/A of the latent image width Wv to the pixel width A, and FIG. 11B being the cleaning and developing properties for the containing ratio of equal to or smaller than 1 $\mu$m.
Figure 11B:
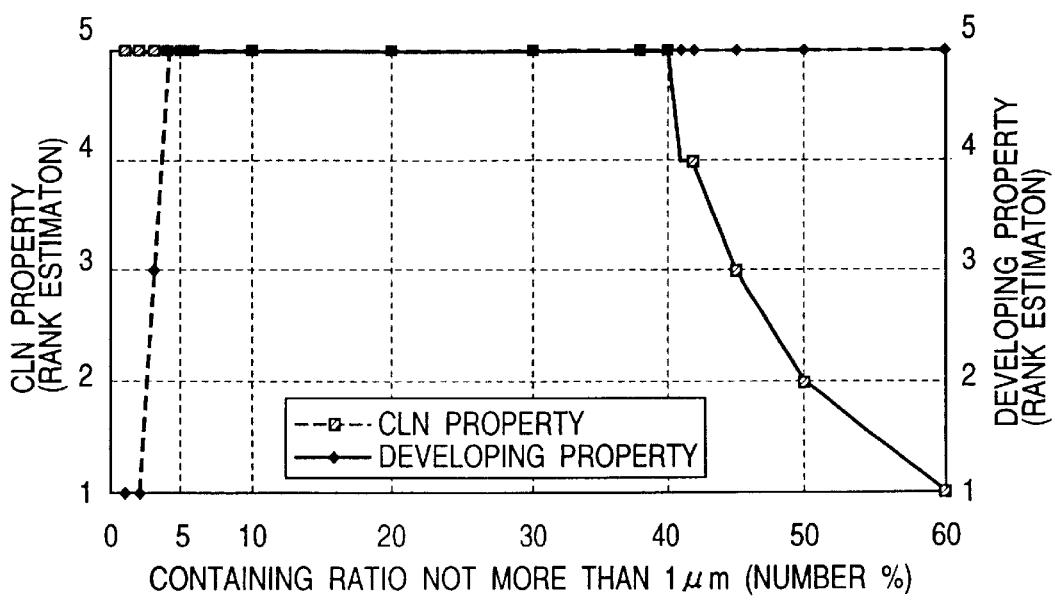

<Experiment 4> (FIGS. 11A and 11B)

This experiment provided representative data relative to the cleaning property (CLN property) of a printer that employed a blade cleaning device 17 (blade CLN), as in the printer in FIGS. 3A and 3B.

A printer (FIGS. 3A and 3B) corresponding to the one used in experiment 2 was employed, and the cleaning property was estimated by changing the ratio of the latent image width Wv to the one-pixel width A.

Furthermore, the particle distribution of the developer was changed in the same manner as in experiment 1, and a developer was obtained wherein particles having a diameter of 1 μm or smaller were present at a different ratio (number %) relative to the all of the developer. The results obtained by estimation of the cleaning property are shown in FIGS. 11A and 11B.

The cleaning was performed by changing the blade pressure. Warping of the blade was examined by increasing the blade pressure, and cleaning failures, such as the failure to remove developer or chattering, were examined by reducing the blade pressure. Then, an estimate was made for the cleaning property by using a total of five ranks (5 is excellent).

The estimate for the development property was made by using the same method as was used for experiment 3.

It is apparent that the cleaning effects were remarkable when the ratio Wv/A was reduced and the preferable ratio Wv/A was equal to or smaller than 1.0. Further, it is apparent that the cleaning property was good when the developer was employed wherein particles having a diameter of 1.0 μm or smaller were present at a ratio of 5 number % or greater throughout the developer.

Furthermore, it is apparent that the developing property was good when particles having a diameter of 1 μm or smaller were present at the ratio of 40 number % or smaller throughout the developer.

From the above results, it is apparent that, as a preferable arrangement, throughout the developer particles having a diameter of 1 μm or smaller should be present at a ratio of 5 to 40 numbers and that the ratio Wv/A should be equal to or smaller than 1.0.

Figure 12A:
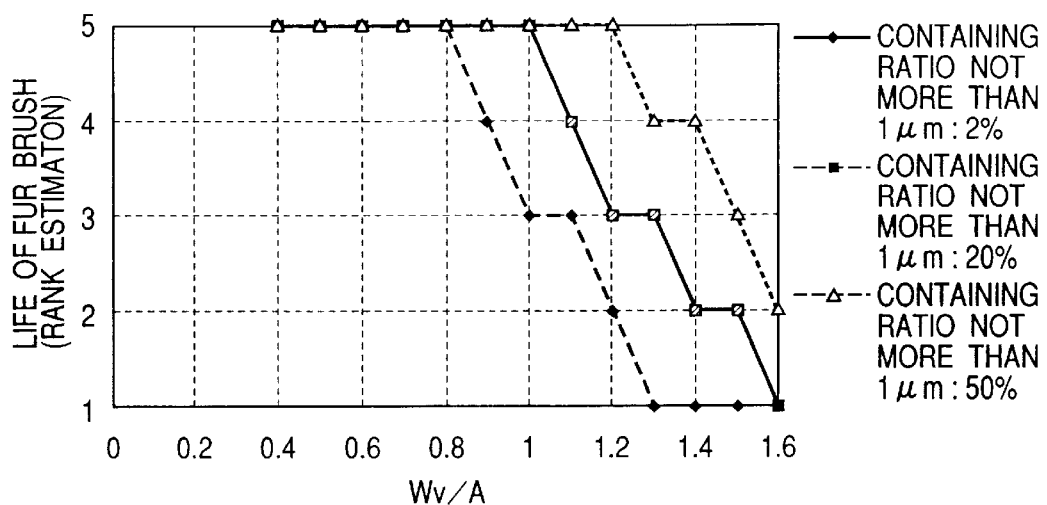
FIGS. 12A and 12B are property graphs for experiment 5, with FIG. 12A being a graph showing the fur brush life at the ratio Wv/A of the latent image width Wv to the pixel width A, and FIG. 12B being the fur brush life and developing property for the containing ratio of equal to or smaller than 1 $\mu$m.
Figure 12B:
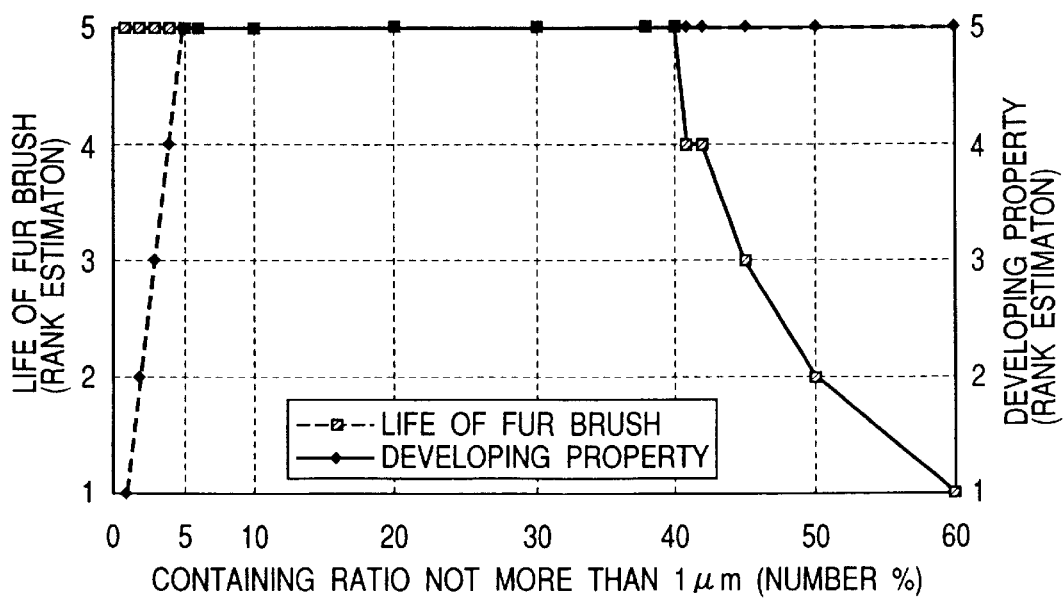

<Experiment 5> (FIGS. 12A and 12B)

This experiment concerns the usable life of a fur brush (brushing means) that is used as a cleaning device.

The printer used for this experiment is the same as the one (FIGS. 3A and 3B) used for experiment 2, with the exception that the blade cleaning device 17 was replaced with a fur brush cleaning device.

A fur brush device was constituted by a support shaft on which a brush was mounted. The support shaft was a copper bar with electroless nickel plating, and the outer diameter was 10 mm. The brush was made of rayon thread containing carbon, which is sold under the product name "Rec-C" by Unitica Ltd., and was shaped like a cylinder with one end of the thread being securely glued using a conductive adhesive. The brush was fixed to the support shaft by double-sided adhesive tape at three places at intervals in the center axial direction. The fineness of the thread was 30 deniers (30/(90×10$^6$)=3.33×10$^{-7}$ kg/rm), the density of the threads was 47000/inch$^2$ (47000/(2.54×10$^{-2}$)$^2$=7.29×10$^{-1}$/m$^2$), and the radial length of the thread was 5 mm. The interval between the support shaft of the fur brush and the photosensitive body, which was mounted on the peripheral surface of a rotary drum, was set at 4 mm, The rotary drum was connected via transmission gears to a rotation source, a DC servo motor, and the photosensitive body that was connected to the peripheral surface of the rotary drum was grounded. A cleaning voltage of −250 V was applied to the fur brush.

The rotary drum was rotated at a peripheral speed of 400 mm/second, and the fur brush was rotated in the opposite direction at a location whereat it contacted the rotary drum.

The thus arranged printer was employed, and the life of the fur brush was estimated by changing the ratio of the latent image width Wv to the one-pixel width A.

Furthermore, the particle distribution of the developer was changed in the same manner as in experiment 1, and a developer was obtained wherein particles having a diameter of 1 μm or smaller were present at a different ratio (number%) throughout the developer. The results obtained by estimating the life of the fur brush are shown in FIGS. 12A and 12b.

When a cleaning failure due to the abrasion of the fur and the time the fusion of the developer occurred are were employed as indexes, the endurance of the fur brush was evaluated to estimate the life of the fur brush using a total of five ranks (5 is excellent).

An estimate for the development property was made using the same method as was used for experiment 3.

It is apparent that the life of the fur brush could be remarkably extended when the ratio Wv/A was small and the preferable ratio Wv/A was equal to or smaller than 1.0.

In addition, it is apparent that the life of the fur brush was extended when a developer was employed wherein throughout the developer particles having a diameter of 1 μm or smaller were present at a ratio equal to or smaller than 5 number %.

For a developer that had a low containing ratio for particles and with which fogging seldom occurred, it is estimated that since only a small amount of the developer was used to develop an image on the surface of the photosensitive body, the buffer effect was reduced, and that, since the fur brush struck the hard surface of the photosensitive body directly, the deterioration of the fur brush was accelerated.

Furthermore, it is apparent that the development property was good when throughout the developer particles having a diameter of 1 μm or smaller were present at a ratio of 40 number %.

From the above results, it is apparent that, as a preferable arrangement, throughout the developer particles having a diameter equal to or smaller than 1 μm should be present at a ratio of 5 to 40 number %, and that a preferable ratio Wv/A is equal to or smaller than 1.0.

Figure 13:
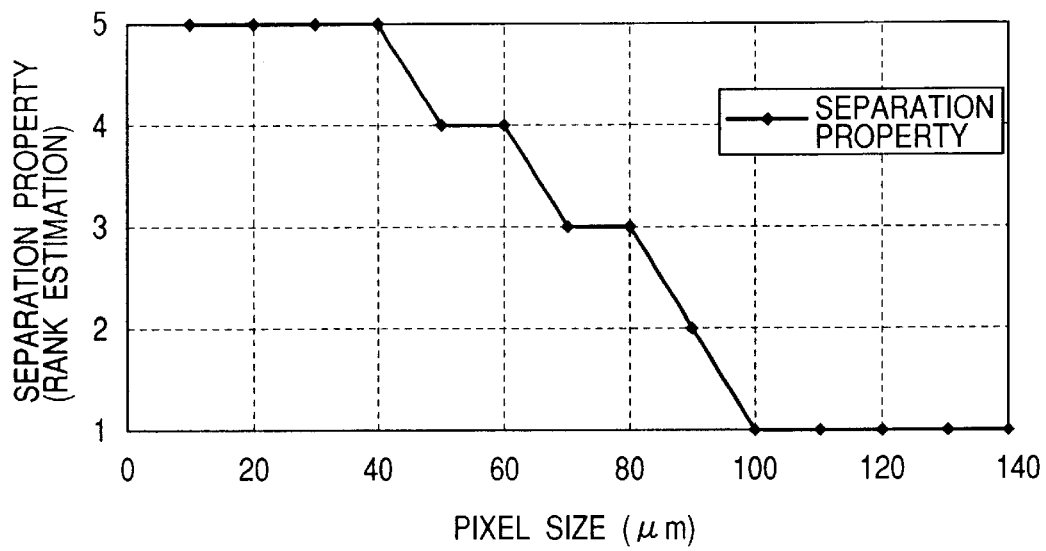
FIG. 13 is a graph showing the separation characteristic relative to a pixel size for experiment 6.

<Experiment 6> (FIG. 13)

For this experiment, the printer (FIGS. 3A and 3B) used for experiment 2 was employed, the spot diameter of a light beam emitted to irradiate pixels was fixed, the size of a pixel on the photosensitive body was changed, and the separation property of the transfer material P was estimated.

The obtained results are shown in FIG. 13. The separation property was estimated using the same method as was used for experiment 3.

It is apparent that the separation property of the transfer material P was good when the pixel size was small and that remarkable effects were obtained with a pixel size that was equal to or smaller than 80 μm. Therefore, when the pixel size is reduced, it is estimated that the density of the toner that contributes to the separation property will be increased, so that the contribution ratio is improved.

Figure 14:
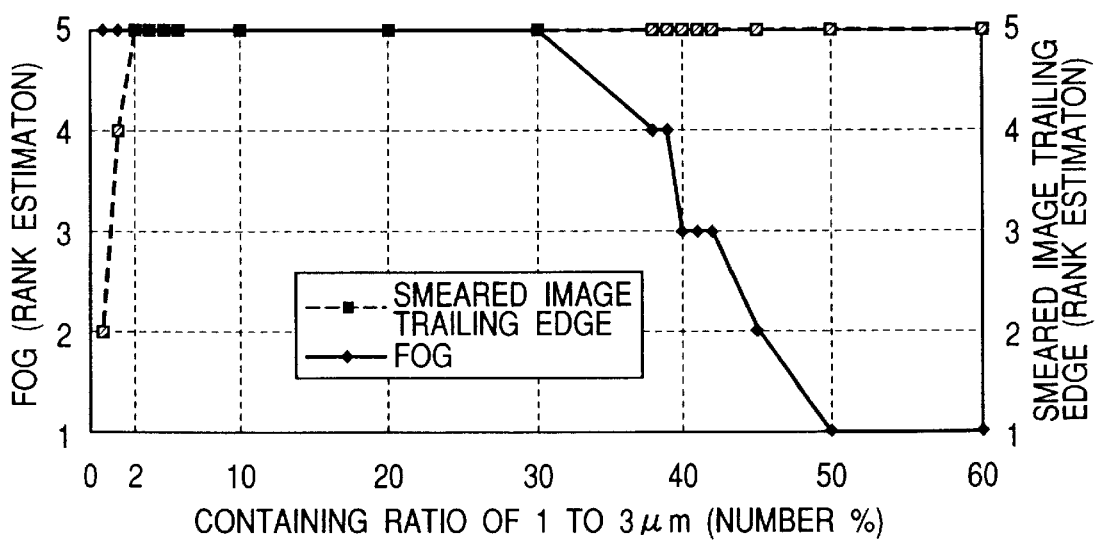
FIG. 14 is a graph showing a fog and a smeared image trailing edge relative to the containing ratio of 1 to 3 $\mu$m for experiment 7.

<Experiment 7> (FIG. 14)

For this experiment, the printer (FIGS. 3A and 3B) used for experiment 2 was employed, the spot diameter of a light beam emitted to irradiate pixels was fixed, the particle distribution of the developer was changed in the same manner as for experiment 1, and a developer was obtained wherein the developer particles having a diameter of 1 to 3 μm were present at a different ratio (number %). The conditions concerning fogging and a image trailing end were estimated, and the obtained results are shown in FIG. 14.

The potentials at the dark and bright portions of the electrostatic latent image were set to the design values, and the reflectivity of the solid white image was compared with the reflectivity of transfer material P that did not bear any image. A total estimate was made for the fogging using five ranks (5 is excellent), while also taking into account the environmental dependency and the endurance.

To make an estimate for the smeared image trailing edge, the potentials at the dark and bright portions of the electrostatic latent image were set to the design values, and a microscope was used to magnify a printed character. The condition under which the developing was performed extended from the outline of the character was estimated using a total of five ranks (5 is excellent), while also taking into account the environmental dependency and the endurance.

It was found that the smeared image trailing edge was worse in an area wherein the ratio was equal to or smaller than 2 number %, that fogging was increased in an area wherein the ratio was equal to or greater than 30 number %, and that the preferable ratio throughout the developer for particles having a diameter of 1 to 3 μm was 2 to 30 number %.

Figure 15:
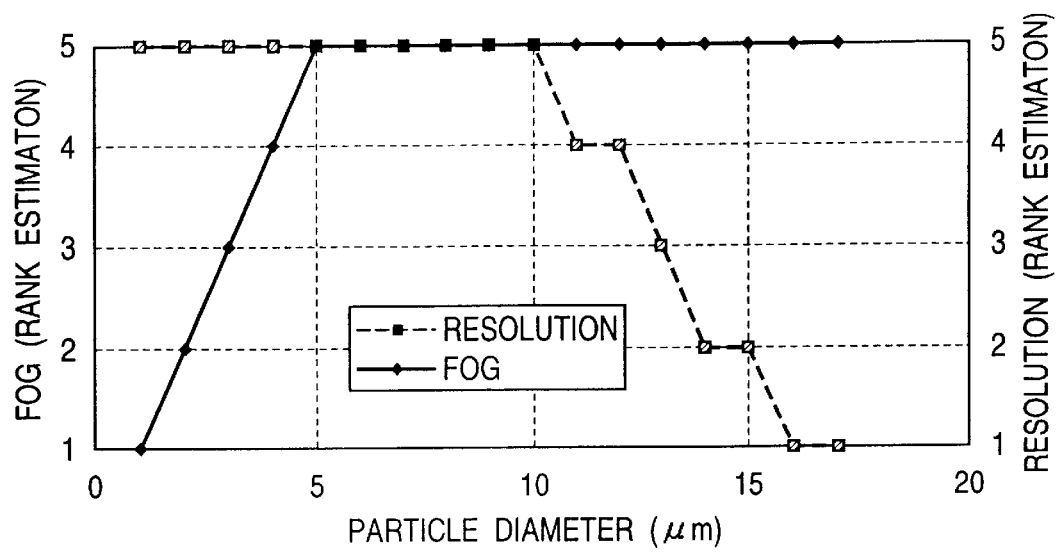
FIG. 15 is a graph showing fogging and a resolution relative to an average particle diameter for experiment 8.

<Experiment 8> (FIG. 15)

For this experiment, the printer (FIGS. 3A and 3B) used for experiment 2 was employed, the spot diameter of a light beam emitted to irradiate pixels was fixed, the particle distribution of the developer was changed in the same manner as in experiment 1, and a developer having a different average particle diameter was prepared. Fogging and the resolution were evaluated, and the obtained results are shown in FIG. 15.

The same method was used for the fogging estimate as was used for experiment 7.

Relating to the resolution, the potentials of the dark and bright portions of the electrostatic latent image were set to the design values, the Canon image chart NA-7 was employed, and a microscope was used to magnify a printed image in a resolution pattern (lines/mm). While taking environmental dependency and endurance into account, the resolution was estimated by using a total of five ranks (5 is excellent).

It was found that fogging was increased in an area wherein the particle diameter was equal to or smaller than 4 μm and that resolution was deteriorated in herein the particle diameter was equal to or greater than 13 μm, and that a preferable average particle diameter is 4 to 13 μm.

The present invention will now be described during the course of an explanation given for the following embodiments. Note, however, that the present invention is not limited to these embodiments.

<Embodiment 1>

The printer used for this embodiment was the same cleanerless printer used for experiment 3. A main charging device was a contact charging member, and a transfer/separation charging device was a transfer roller.

The BAE method was employed for image forming, and an a-Si photosensitive body was used. The pixel size A was 50 μm, and the ratio Wv/A of the latent image width Wv to the pixel size A was 0.8. A developer having an average particle diameter of 8 μm was employed wherein particles having a diameter equal to or smaller than 1 μm were present at a ratio of 20 number % and particles having a diameter of 1 to 3 μm were present at a ratio of 20 number %. Fogging, the line width, the development proper, the separation proper, the smeared image trailing edge, and the resolution were determined by using rants of excellent (very good), good, fair (no problem in practical use), and fail (problem in practical use), and the results are shown in Table 1.

As is apparent from Table 1, an "excellent" estimation was obtained for the system in this embodiment.

<Embodiment 2>

The printer (FIGS. 3A and 3B) used for experiment 2 was also employed for this embodiment.

The image forming method, the photosensitive body, the pixel size, the ratio Wv/A, the average particle diameter of the developer, the containing ratio for particles having a diameter of 1 μm or smaller, and the containing ratio for particles having a diameter of 1 to 3 μm are the same as those for embodiment 1.

For the printer in this embodiment, fogging, the line width, the development property, the separation property, the cleaning property, the smeared image trailing edge, and the resolution were estimated in the same manner as in embodiment 1, and the obtained results are shown in Table 1.

As is apparent from Table 1, totally "excellent" results were obtained for the system of this embodiment.

<Embodiment 3>

The same printer (FIGS. 3A and 3B) as was used for experiment 2 was also employed for this embodiment, with the exception that the blade cleaning device 17 was replaced with a fur brush cleaning device.

The image forming method, the photosensitive body, the pixel size, the ratio Wv/A, the average particle diameter of the developer, the containing ratio of particles having a diameter equal to or smaller than 1 μm, and the particles having a diameter of 1 to 3 μm were the same as those used for embodiment 1.

For the printer of this embodiment, fogging, the line width, the development property, the separation property, the cleaning property, the smeared image trailing edge, and the resolution were estimated in the same manner as embodiment 1, and the obtained results are shown in Table 1. In addition, in this embodiment, the life of the fur brush was also examined.

As is apparent from the obtained results, totally "excellent" results were obtained for the system of this embodiment.

<Embodiment 4>

The printer (FIGS. 3A and 3B) used for experiment 2 was also used for this embodiment, with the exception that the laser scanner 13, which was an optical scanning, device, was replaced by an optical LED array exposure device.

The image forming method, the photosensitive body, the pixel size, the ratio Wv/A, the average particle diameter of the developer, the containing ratio of particles having a diameter equal to or smaller than 1 μm, and the particles having a diameter of 1 to 3 μm are the same as those for embodiment 1.

For the printer of this embodiment, fogging, the line width, the development property, the separation property, the cleaning property, the smeared image trailing edge, and the resolution were estimated in the same manner as embodiment 1, and the obtained results are shown in Table 1.

As is apparent from the results, totally "excellent" results were obtained for the system of this embodiment.

Comparison Example 1

The same printer was used as was employed for embodiment 2, with the exception that the ratio Wv/A was changed to 0.4. The performance of the printer was evaluated and the obtained results are shown in Table 1.

Overall "problem in practical use" results were obtained for the system in this comparison example.

Comparison Example 2

The same printer was used as was employed for embodiment 2, with the exception that the ratio Wv/A was changed to 1.6. The performance of the printer was evaluated and the obtained results are shown in Table 1.

Overall "problem in practical use" results were obtained for the system in this comparison example.

Comparison Example 3

The same printer was used as was employed for embodiment 2, with the exception that the pixel size was changed to 100 μm. The performance of the printer was evaluated and the obtained results are shown in Table 1.

Overall "no problem in practical use" results were obtained for the system in this comparison example.

Comparison Example 4

The same printer was used as was employed for embodiment 2, with the exception that the containing ratio of the developer particles having a diameter equal to or smaller than 1 μm was changed to 1 number %. The performance of the printer was evaluated and the obtained results are shown in Table 1.

Overall "problem in practical use" results were obtained for the system in this comparison example.

Comparison Example 5

The same printer was used as was employed for embodiment 2, with the exception that the containing ratio of the developer particles having a diameter equal to or smaller than 1 μm was changed to 60 number %. The performance of the printer was evaluated and the obtained results are shown in Table 1.

Overall "problem in practical use" results were obtained for the system in this comparison example.

Comparison Example 6

The sane printer was used as was employed for embodiment 2, with the exception that the containing ratio of the developer particles having a diameter of 1 to 3 μm was changed to 1 number %. The performance of the printer was evaluated and the obtained results are shown in Table 1.

Overall "problem in practical use" results were obtained for the system in this comparison example.

Comparison Example 7

The same printer was used as was employed for embodiment 2, with the exception that the containing ratio of the developer particles having a diameter of 1 to 3 μm was changed to 50 number %. The performance of the printer was evaluated and the obtained results are shown in Table 1.

Overall "problem in practical use" results were obtained for the system in this comparison example.

Comparison Example 8

The same printer was used as was employed for embodiment 2, with the exception that the average particle diameter was changed to 2 μm. The performance of the printer was evaluated and the obtained results are shown in Table 1.

Overall "problem in practical use" results were obtained for the system in this comparison example.

Comparison Example 9

The same printer was used as was employed for embodiment 2, with the exception that the average particle diameter was changed to 16 μm. The performance of the printer was evaluated and the obtained results are shown in Table 1.

Overall "no problem in practical use" results were obtained for the system in this comparison example.

TABLE 1

| | [Condition] | | | | |
|---|---|---|---|---|---|
| | Wv/A | Pixel Size (μm) | Containing ratio of not more than 1 μm (number %) | Containing ratio of 1 to 3 μm (number %) | Average particle diameter (μm) |
| Embodiment 1 | 0.8 | 50 | 20 | 20 | 8 |
| Embodiment 2 | 0.8 | 50 | 20 | 20 | 8 |
| Embodiment 3 | 0.8 | 50 | 20 | 20 | 8 |
| Embodiment 4 | 0.8 | 50 | 20 | 20 | 6 |
| Comparison Example 1 | 0.4 | 50 | 20 | 20 | 8 |
| Comparison Example 2 | 1.6 | 50 | 20 | 20 | 8 |
| Comparison Example 3 | 0.8 | 100 | 20 | 20 | 8 |
| Comparison Example 4 | 0.8 | 50 | 1 | 20 | 8 |
| Comparison Example 5 | 0.8 | 50 | 60 | 20 | 8 |

TABLE 1-continued

| | | | | | | |
|---|---|---|---|---|---|---|
| Comparison Example 6 | 0.8 | 50 | 20 | | 1 | 8 |
| Comparison Example 7 | 0.8 | 50 | 20 | | 50 | 8 |
| Comparison Example 8 | 0.8 | 50 | 20 | | 20 | 2 |
| Comparison Example 9 | 0.8 | 50 | 20 | | 20 | 16 |

[Results]

| | Fog | Line width | Developing property | Separation property | CLN property | Fur brush life | Smeared image trailing edge | Resolution | Total estimation |
|---|---|---|---|---|---|---|---|---|---|
| Embodiment 1 | Excellent | Excellent | Excellent | Excellent | — | — | Excellent | Excellent | Excellent |
| Embodiment 2 | Excellent | Excellent | Excellent | Excellent | Excellent | — | Excellent | Excellent | Excellent |
| Embodiment 3 | Excellent | Excellent | Excellent | Excellent | Good | Excellent | Excellent | Excellent | Excellent |
| Embodiment 4 | Excellent | Good | Excellent | Excellent | Excellent | — | Excellent | Excellent | Good |
| Comparison Example 1 | Fail | Excellent | Excellent | Excellent | Excellent | — | Excellent | Excellent | Fail |
| Comparison Example 2 | Excellent | Fail | Excellent | Excellent | Good | — | Excellent | Excellent | Fail |
| Comparison Example 3 | Excellent | Excellent | Excellent | Fair | Fair | — | Excellent | Fair | Fair |
| Comparison Example 4 | Excellent | Excellent | Excellent | Fail | Fail | — | Excellent | Excellent | Fail |
| Comparison Example 5 | Excellent | Excellent | Fail | Excellent | Excellent | — | Excellent | Excellent | Fail |
| Comparison Example 6 | Excellent | Excellent | Excellent | Excellent | Excellent | — | Fail | Excellent | Fail |
| Comparison Example 7 | Fail | Excellent | Excellent | Excellent | Excellent | — | Excellent | Excellent | Fail |
| Comparison Example 8 | Fail | Excellent | Excellent | Excellent | Excellent | — | Excellent | Excellent | Fail |
| Comparison Example 9 | Excellent | Excellent | Excellent | Excellent | Excellent | — | Excellent | Fail | Fair |

<Photosensitive Bodies>

Photosensitive bodies are roughly sorted into an organic type and an inorganic type.

[Organic Photoconductor (OPC)]

Various organic photoconductor materials have been developed and are used for electrophotographic photosensitive bodies, especially for a function separation type of photosensitive body, wherein a charge generation layer and a charge carrying layer are laminated, that is already in practical use and is mounted on a copier and a laser beam printer.

However, the function separation photosensitive body has one large problem in that its endurance is generally low. The deterioration of the photosensitive body is roughly sorted into electrophotographic deterioration, such as sensitivity, residual potential and charging capability or the occurrence of unfocused images, and mechanical deterioration, such as the abrasion and scratching of the surface of the photosensitive body due to friction. Endurance is a greatly important factor that determines the life of a photosensitive body.

It is known that electrophotographic deterioration, especially the occurrence of an unfocused image, results from the deterioration of a charge carrying material, contained in the surface layer of a photosensitive body, that is due to the presence of an active material, such as ozone or NOx, that is generated by the corona charging device.

Further, it is known that mechanical deterioration occurs when paper, a cleaning member, such as a blade or a roller, and toner physically contact and rub against a photosensitive layer.

To improve the electrophotographic endurance, it is important for a charge carrying material to be employed that is not greatly affected by an active material, such as ozone or NOx, and for a charge carrying material having of a high oxide potential to be selected.

To improve the mechanical endurance, it is important for the smoothness of surfaces to be increased and for friction to be reduced in order to resist the rubbing of paper and of the cleaning member, and for the releasing property of surfaces to be improved so as to prevent the filming fusion of toner. It is known that for this a slip additive, such as fluorocarbon polymer powder, graphite fluoride powder, or polyolefin polymer powder, can be mixed into the surface layer.

However, when there is extremely little abrasion, hygroscopic material generated by the active material, such as NOx, is deposited on the surface of the photosensitive body, and as a result, the surface resistance is reduced and the surface charge is moved horizontally, so that a so-called smeared image is generated.

Figure 16:
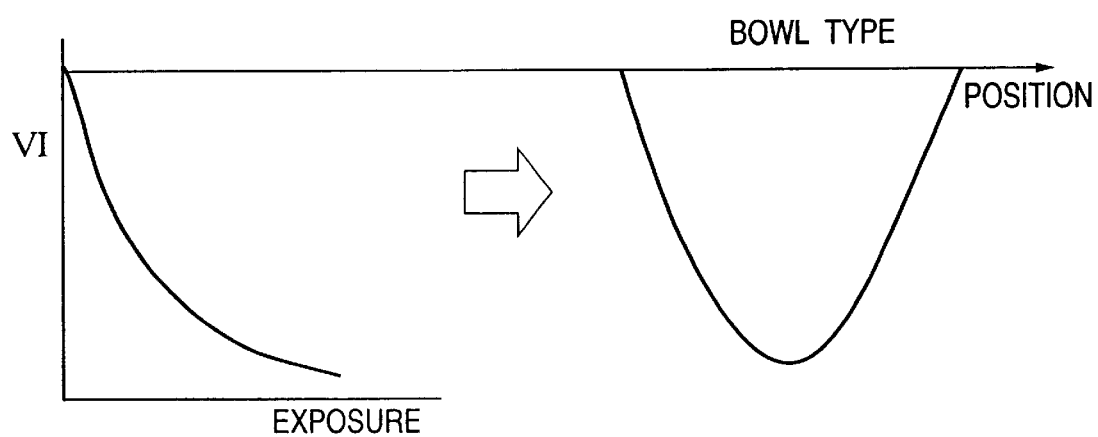
FIG. 16 is a diagram showing, relative to the light quantity distribution of Gaussian distribution, the model of a latent image formed on a photosensitive body that has an EV property that forms a downward projected shape.

As for sensitivity, an organic photosensitive body generally has a field dependency derived from the principle of carrier transmission. Since the EV property (the potential property related to optical energy; the horizontal axis representing the optical energy and the vertical axis representing the potential) has a downward projected shape, as is shown in FIG. 16, a small optical energy change tends to be reflected in the potential.

Therefore, since potential distribution having a bowl shape appears as the Gaussian distribution, when the bottom of the optical energy distribution is changed, this change greatly affects the changes in dot diameters, and also adversely affects image quality.

Further, since abrasion is required for the above described reasons, the endurance of the sensitivity, i.e., the EV property, is changed, and the smearing of dots occurs as a result of light scattering that is caused by the changing of the surface shape due to abrasion.

[Inorganic Photoconductor: Amorphous Silicon Photosensitive Body (a-Si)]

For electrophotography, high sensitivity, a high SN ratio (photocurrent (Ip)/dark current (Id)), an absorption spectrum that matches the spectrum property of a radio wave to be emitted, a high optical responsibility, a desired dark resistance value, and the assurance that human beings will not be harmed during operation are required for the photoconductor material that forms the photosensitive layer of a photosensitive body.

In particular, it is important that a photosensitive body incorporated in an image forming apparatus used in an office generate of no pollution during operation.

A photoconductor material having such an superior property is, for example, amorphous silicon hydride (hereinafter referred to as "a-Si:H"), and in Japanese Patent Publication No. 60-35059, this material is used for a photosensitive body for an image forming apparatus.

FIGS. 17A to 17D are specific diagrams for explaining the layer structure of a photosensitive body.

Figure 17A:
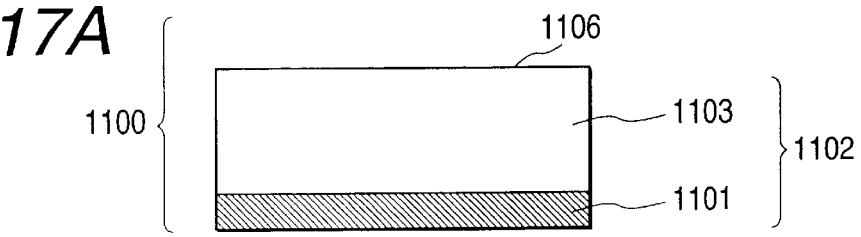
FIGS. 17A, 17B, 17C and 17D are specific diagrams for explaining the layer structure of the photosensitive body.

A photosensitive body 1100 in FIG. 17A is designed so that a photosensitive layer 1102 is deposited on a support body 1101. The photosensitive layer 1102 includes a photoconductive layer 1103 composed of a-Si:H,X.

Figure 17B:
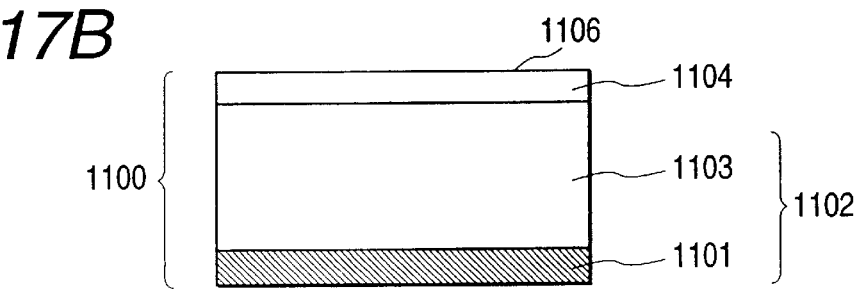

A photosensitive body 1100 in FIG. 17B is so designed that a photosensitive layer 1102 is deposited on a support body 1101. The photosensitive layer 1102 includes a photoconductive layer 1103 composed of a-Si:H,X, and an amorphous silicon surface layer 1104.

Figure 17C:
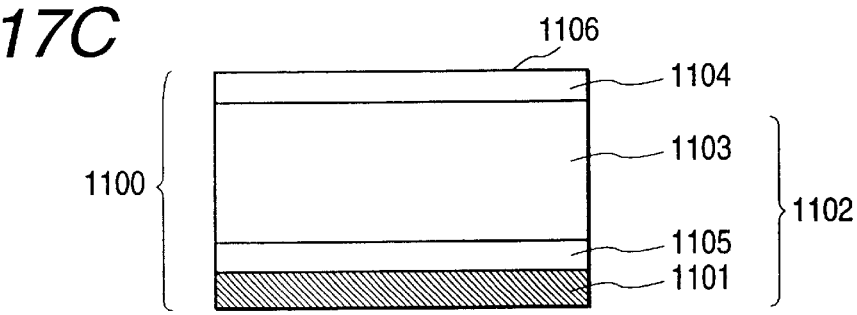

A photosensitive body 1100 in FIG. 17C is so designed that a photosensitive layer 1102 is deposited on a support body 1101. The photosensitive layer 1102 includes a photoconductive layer 1103 composed of a-Si:H,X, an amorphous silicon surface layer 1104, and an amorphous silicon charge injection prevention layer 1105.

Figure 17D:
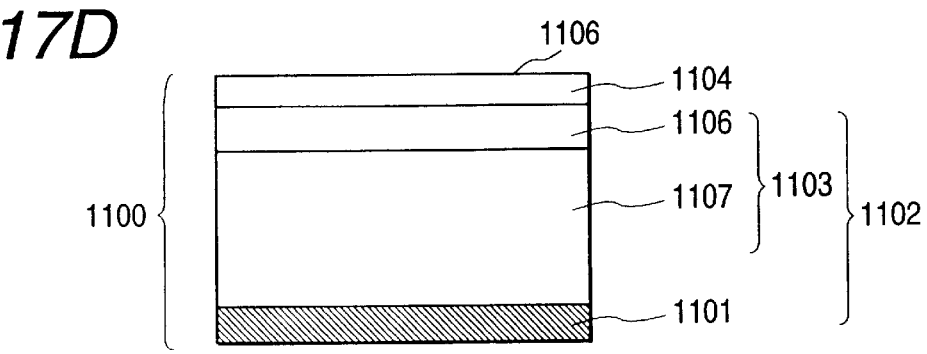

A photosensitive body 1100 in FIG. 17D is so designed that a photosensitive layer 1102 is deposited on a support body 1101. The photosensitive layer 1102 includes a charge generation layer 1106, composed of a-Si:H,X, and a charge carrying layer 1107, both of which consist of a photoconductive layer 1103, and an amorphous silicon surface layer 1104.

Generally, for a photosensitive body composed of a-Si:H, the conductive support body is heated to 50 to 400° C., and a photoconductive layer made of a-Si is formed on the support body using a film deposition method, such as vacuum evaporation, sputtering, ion plating, thermal CVD, optical CVD or plasma CVD (hereinafter referred to as "PCVD"). Above all, the PCVD method, i.e., the method by which a material gas is decomposed by a direct current, a high frequency or microwave glow discharge, and for depositing an a-Si film on the support body, is practically employed.

Furthermore, in Japanese Patent Application Laid-Open No. 54-83746, is proposed a photosensitive body, for an image forming apparatus, that includes a conductive support body and an a-Si (hereinafter referred to as "a-Si:X") photoconductive layer that contains halogen atoms as components. In this publication, when halogen atoms are contained in a-Si at 1 to 40 atomic %, high heat resistance and satisfactory electric and optical properties can be obtained by the photoconductor layer of a photosensitive body used for an image forming apparatus.

In Japanese Patent Application Laid-Open No. 57-11556, a technique is disclosed whereby a surface layer composed of a nonphotoconductive amorphous material that contains silicon atoms and carbon atoms is deposited on a photoconductive layer made of an amorphous material that mainly contains silicon atoms, in order to improve the electric, optical and photoconductive properties of the photoconductive member, including the photoconductive a-Si film, such as a dark resistance value, photosensitivity and optical responsibility, a use environment property, such as moisture resistance, and time-transient stability.

Further, in Japanese Patent Application Laid-Open No. 60-67951, a technique is disclosed for a photosensitive body on which is laminated a light transmitting and insulating overcoating layer containing amorphous silicon, carbon, oxide and fluorine. In Japanese Patent Application Laid-Open No. 62-168161, a technique is disclosed that employs, for a surface layer, a nonamorphous material containing silicon atoms, carbon atoms and hydrogen atoms at 41 to 70 atomic %.

Furthermore, according to Japanese Patent Application Laid-Open No. 57-158650, a photoconductor layer is formed of a-Si:H, wherein hydrogen at 10 to 40 atomic % is contained and for which the absorption coefficient ratio for the infrared absorption spectrum, at absorption peaks of 2100 $cm^{-1}$ and 2000 $cm^{-1}$, is 0.2 to 1.7. As a result, a sensitive and highly resistant photosensitive body can be obtained for an image forming apparatus.

Moreover, according to the technique disclosed in Japanese Patent Application Laid-Open No. 60-95551, in order to improve the image quality provided by an amorphous silicon photosensitive body, a temperature of 30 to 40° C. is maintained near the surface of the photosensitive body, and image forming processing, such as charging, exposing, developing and transferring, is performed. As a result, a reduction in the surface resistance of a photosensitive body due to the absorption of water on the surface, and the smearing of images (smearing resulting from high humidity) that accordingly occurs can be prevented.

According to these techniques, the electric, optical and photoconductive properties of a photosensitive body used for an image forming apparatus, and environmental property use are enhanced, while the image quality is also improved.

Figure 18:
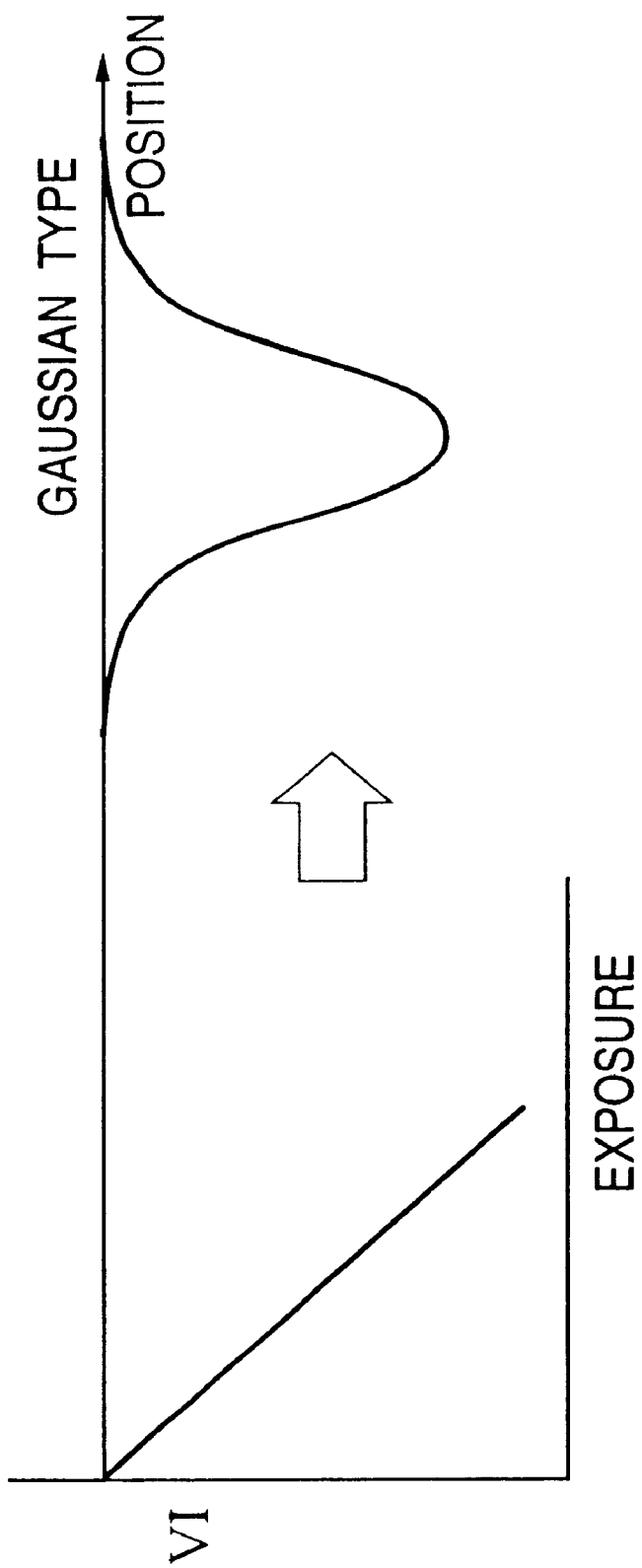
FIG. 18 is a diagram showing, relative to the light quantity distribution of Gaussian distribution, the model of a latent image formed on a photosensitive body that has a linear EV property.

As for sensitivity, it is general rule that an amorphous photosensitive body does not have field dependency in accordance with the principle of carrier transmission, and that the EV property has a linear shape, as is shown in FIG. 18, so that an optical energy change is not reflected by the potential.

Therefore, the optical energy distribution and the potential distribution are both Gaussian distributions. So that when the bottom of the optical distribution is changed, the dot diameter is comparatively little affected, and image quality is seldom deteriorated.

Further, since the abrasion by endurance is not required, a change in sensitivity, i.e., an endurance change of the EV property, is small, and the problem that has arisen for an OPC in association with abrasion is not present.

(A) Support Body 1101

The support body 1101 may be either conductive or insulating. A conductive support body 1101 can be made of a well known metal, such as Al or Fe, or an alloy of these metals, such as stainless steel. Furthermore, an insulating support body 1101 can be made of a synthetic resin film or sheet (glass or a ceramic may also be employed) for which the conduction process has at least been performed on the surface on which a photosensitive layer is to be formed.

The shape of the support body 1101 may be a cylinder, a plate, or an endless belt having a smooth surface or a raised or recessed surface.

Especially for image forming using coherent light, such as a laser beam, the surface of a support body 1101 may be raised or recessed so long as the charge carriers are not substantially reduced, and an image failure due to a so-called coherent striped pattern that appears on a visible image can be effectively avoided. To raise or recess the surface of the support body 1101, a well known method disclosed in Japanese Patent Application Laid-Open Nos. 60-168156, 60-178457 and 60-225854 can be employed.

As another method for effectively preventing an image failure due to a coherent striped pattern that appears when a coherent light, such as a laser beam, is used, multiple spheroidal trace dents may be formed to raise or recess the surface of a support body 1101 so long as the charge carriers are not substantially reduced. That is, the surface of a support body 1101 may have raised and recessed portions exceeding the resolution that is requested of the photosensitive body 1100, and these raised and recessed portions can be formed by using multiple spheroidal trace dents. The method disclosed in Japanese Patent Application Laid-Open No. 61-231561 is employed to form multiple spheroidal trace dents to raise and recess the surface of a support body 1101.

As an additional method for effectively preventing an image failure due to a coherent striped pattern that appears when a coherent light, such as a laser beam, is employed, an interference prevention layer or area, such as a light absorption layer, may be formed inside or under the photosensitive layer 1102.

(B) Photoconductive layer 1103

The photosensitive layer 1103 that constitutes one part of the photosensitive layer 1102 is deposited on an underlayer (not shown) that is formed as needed on a support body 1101. Before the photoconductive layer 1103 is formed by vacuum film deposition, an appropriate numerical condition for a deposition parameter is set in order to obtain a desired property For this, various thin film deposition methods can be employed; for example, the glow discharge method (an alternating-current discharge CVD, such as a low frequency CVD, a high frequency CVD or a microwave CVD, or a direct-current discharge CVD), sputtering, vacuum evaporation, ion plating, optical CVD and thermal CVD These thin-film deposition methods are selected in accordance with manufacturing conditions, equipment investment overheads, manufacturing scale and the properties desired for the photosensitive body that is to be produced. However, the glow discharge method is most appropriate because the conditions for manufacturing a photosensitive body having desired properties are comparatively easy to control.

In order to deposit the photoconductive layer 1103 using the glow discharge method, basically, a material gas for supplying silicon atoms (Si) and a material gas for supplying hydrogen atoms (H), and/or a material gas for supplying halogen atoms (X) are introduced in desired states into a reaction container for which the pressure can be reduced. Then, the glow discharge is initiated inside the reaction container, and only a layer composed of a-Si:H,X need be deposited on the support body 1101 that is positioned at a predetermined location in advance.

It is necessary for the photoconductive layer 1103 to contain hydrogen atoms and/or halogen atoms, in order to compensate for nonbonding portions of silicon atoms, and to improve the layer quality, especially, the photoconductive and charge holding properties. Therefore, preferably, the content of hydrogen atoms or halogen atoms, or the sum of the hydrogen atoms and the halogen atoms is 10 to 30 atomic %, or more preferably, 15 to 25 atomic %, relative to the sum of the silicon atoms and hydrogen atoms and/or the halogen atoms.

Silicon hydride (silan) in a gaseous state, or in a state that can be gasified, Is effectively employed as the material for an Si supply gas. $SiH_4$ and $Si_2H_6$ are especially preferable because they are easy to handle during the layer deposition process, and the efficiency with which Si is supplied is superior.

Further, it is also necessary for a desired amount of a silicon compound gas containing $H_2$ and/or He or hydrogen atoms to be mixed with the above gas in order to form a layer. As a result, hydrogen atoms can be systematically introduced into the photosensitive layer 1103, the ratio of the hydrogen atoms to be introduced can be more easily controlled, and the film property that implements the purpose of the process can be obtained. Not simply one gas, but also a plurality of gases may be mixed at a predetermined mixture ratio.

In addition, preferably, an effective material gas for supplying halogen atoms is a halogen gas, or a halogen compound, such as halide, an inter-halogen compound containing halogen or a silan derivative that is replaced by halogen, that is in the gaseous state or that can be gasified.

Further, a silicon hydride compound that contains silicon atoms and halogen atoms and that is in a gaseous state or that can be gasificated can be effective.

In order to control the quantity of hydrogen atoms and/or halogen atoms contained in the photoconductive layer 1103, for example, merely the temperature of the support body 1101, the quantity of the material that is introduced into the reaction container and is used to mix the hydrogen atoms and/or halogen atoms in the layer 1103, and the discharge power need be adjusted.

It is preferable that atoms that control conduction be contained, as needed, in the photoconductive layer 1103. The atoms that control the conduction may be uniformly contained in the photoconductive layer 1103, or may be partially contained with an uneven distribution extending in the direction of the thickness of the layer.

A so-called impurity in a semiconductor field can be employed as the atoms for controlling the conduction. As is well known, such atoms can be those (the IIIb atoms) that belong to the IIIb group in the periodic table for providing the p-type conductive property, or those (the Vb atoms) that belong to the Vb group in the periodic table for providing the n-type conductive property.

The material that is used for introducing the atoms that control the conduction may be diluted with $H_2$ and/or He.

Further, according to the present invention, it is also effective for carbon atoms and/or oxygen atoms, and/or nitrogen atoms to be contained in the photoconductive layer 1103. The carbon atoms and/or the oxygen atoms, and/or the nitrogen atoms may be uniformly contained in the photoconductive layer 1103, or may be contained in one part extending in the direction of the thickness of the layer 1103 with an uneven distribution that provides for the changing of the content.

The desired thickness of the photoconductive layer 1103 is determined while taking into account a desired electrophotographic property and economic effects. Preferably, the thickness of the photoconductive layer 1103 is 20 to 50 $\mu$m, or more preferably, 23 to 45 $\mu$m, or optimally, 25 to 40 $\mu$m.

To obtain the photoconductive layer 1103 having a desired film property, the mixture ratios for the Si supply gas and the diluted gas, the gas pressure in the reaction container, the discharge power and the temperature of the support body can be appropriately determined.

Generally, the above described conditions are not determined independently, and it is preferable that optimal values for them be determined based on mutual and organic relationships in order to acquire a photosensitive body having desired properties.

(C) Surface Layer 1104

It is preferable that the surface layer 1104 be formed on the photoconductive layer 1103 that is deposited on the support body 1101 in the above described manner. The surface layer 1104 has a free surface 1106, and is deposited mainly to provide humidity resistance, a property for continuous and repetitive employment, pressure resistance, a usage environmental property and endurance.

The surface layer 1104 is preferably made of amorphous silicon (a-Si); amorphous silicon (hereinafter referred to as "a-SiC:H,X") that contains hydrogen atoms (H) and/or halogen atoms (X) and carbon atoms; amorphous silicon (hereinafter referred to as "a-SiO:H,X") that contains hydrogen atoms (H) and/or halogen atoms (X) and oxygen atoms; amorphous silicon (hereinafter referred to as "a-SiN:H,X") that contains hydrogen atoms (H) and/or halogen atoms (X) and nitrogen atoms; or amorphous silicon (hereinafter referred to as "a-SiCON:H,X") that contains hydrogen atoms (H) and/or halogen atoms (X) and further contains at least either carbon atoms, oxygen atoms or nitrogen atoms.

The surface layer 1104 is formed by the vacuum film deposition method while an appropriate numerical condition for a film deposition parameter is set to obtain a desired property.

Specifically, various thin film deposition methods can be employed; for example, the glow discharge method (an alternating-current discharge CVD, such as the low frequency CVD, the high frequency CVD or the microwave CVD, or a direct-current discharge CVD), sputtering, vacuum evaporation, ion plating, optical CVD and thermal CVD. These thin-film deposition methods are selected in accordance with manufacturing conditions, equipment investment overheads, manufacturing scale and the properties desired for the photosensitive body that is to be produced. However, the same film deposition method as is used for the photosensitive layer is appropriate because of the productivity of the photosensitive body.

In order to deposit the surface layer 1104, composed of a-SiC:H,X, using the glow discharge method, basically, a material gas for supplying silicon atoms (Si), a material gas for supplying carbon atoms (C), and a material gas for supplying hydrogen atoms (H) and/or a material gas for supplying halogen atoms (X) are introduced in desired states into a reaction container for which the pressure can be reduced. Then, the glow discharge is initiated inside the reaction container, and only a layer composed of a-SiC:H,X need be deposited on the photoconductive layer 1103 that is formed on the support body 1101 is positioned at a predetermined location.

It is preferable that when a-SiC is used as a primary element for the surface layer 1104, the carbon content fall within the range of 30 to 90% of the sum of the silicon atoms and the carbon atoms It is also necessary for the surface layer 1104 to contain hydrogen atoms and/or halogen atoms, in order to compensate for nonbonding portions of silicon atoms, and to improve the layer quality, especially the photoconductive and charge holding properties. Therefore, the content of hydrogen atoms, relative to the total of the constituent atoms, is normally 30 to 70 atomic %, preferably, 35 to 65 atomic %, and optimally, 40 to 60 atomic %.

The content of the fluorine atoms is normally 0.01 to 15 atomic %, preferably, 0.1 to 10 atomic %, and optimally 0.6 to 4 atomic %.

It is known that a defect in the surface layer (mainly a dangling bond of the silicon atoms and carbon atoms) adversely affects the properties of a photosensitive body used for an image forming apparatus For example, the charging property is deteriorated by the injection of electric charges from the free surface into the photoconductive layer; the charging property is caused to fluctuate by changing the surface structure in accordance with the employment environment, e.g., at a high humidity, or an afterglow phenomenon occurs during repetitive employment while corona charging or light irradiation is being performed, or when electric charges from the photoconductive layer are injected into the surface layer and are trapped in a defect therein.

When the content of hydrogen in the surface layer is adjusted to a ratio that is equal to or greater than 30 atomic %, defects in the surface layer are is considerably reduced, and electric properties and fast continuous usage can be improved. When the content of hydrogen in the surface layer exceeds 70 atomic %, the hardness of the surface layer is reduced, and endurance is deteriorated.

Further, when the content of fluorine in the surface layer is adjusted to 0.01 atomic % or greater, bonding of the silicon atoms and carbon atoms in the surface layer can be performed more effectively. In addition, one action performed by the fluorine atoms in the surface layer is the effective prevention of the separation, due to damage, of the silicon atoms and the carbon atoms, such as is induced by a corona discharge. When the content of fluorine in the surface layer exceeds 15 atomic %, there is substantially no effect on the bonding of the silicon atoms and the carbon atoms in the surface layer, but the separation of bonded atoms is prevented. Further, since excessive fluorine atoms disturb the movement of the carrier in the surface layer, the residual potential and the image memory are remarkable.

The fluorine content and the hydrogen content of the surface layer can be controlled by the flow rate of the $H_2$ gas, the temperature of the support body, the discharge power, and the gas pressure.

The thickness of the surface layer 1104 is normally 0.01 to 3 $\mu$m, preferably, 0.05 to 2 $\mu$m, and optimally, 0.1 to 1 $\mu$m. When the thickness of the surface layer is less than 0.01 $\mu$m, the surface layer is lost due to abrasion while the photosensitive body is in use. And when the thickness of the surface layer exceeds 3 $\mu$m, deterioration of electrophotographic properties, such as an increase in the residual potential, occurs.

The surface layer 1104 is formed carefully so as to obtain a desired property as requested. That is, the material that contains Si, C and/or N and/or O, H and/or X can employ the crystal structure or the amorphous structure in accordance with the deposition condition. Further, the conductive property, the semiconductive property or the insulating property is employed as the electric property, and either the photoconductive property or the non-photoconductive property is employed. Thus, the formation condition is strictly selected so as to obtain a compound having a desired property that is consonant with the objective.

For example, when the improvement of the pressure resistance constitutes the main objective, the surface layer 1104 is formed as a nonamorphous member whose insulating property is remarkable in the usage environment.

Further, when the improvement of the continuous and repetitive usage property and the usage environment property is the main objective, the surface layer 1104 is formed as a nonamorphous member whose insulating property is moderate to a degree and that is sensitive to a degree to a projected light.

In addition, it is preferable that, during the deposition of the surface layer 1104, its resistance be appropriately controlled in order to prevent image smearing due to low resistance of the surface layer 1104 or to prevent an adverse effect stemming from the residual potential, and to enhance the charging efficiency.

It is also effective for a blocking layer (undersurface layer), which contains fewer carbon atoms, oxygen atoms and nitrogen atoms than the surface layer, to be deposited between the photoconductive layer and the surface layer, so as to further enhance the charging capability.

Furthermore, an area wherein the content of the carbon atoms and/or oxygen atoms and/or the nitrogen atoms is reduced toward the photoconductive layer 1103 may be provided between the surface layer 1104 and the photoconductive layer 1103. Thus, the surface layer 1104 and the photoconductive layer 1103 can contact each other more closely, and the affect of the interference due to the reflection of light on the surface can be further reduced.

It is also effective for amorphous carbon (a-C) to be employed for the surface layer 1104. The a-C material has the same of greater hardness as does the a-SiC, and is superior in water repellency, endurance and printing resistance.

When the a-C surface layer is used as a part or as all of the surface layer 1104, the printing resistance property and the environmental property can be further improved.

(D) Charge Injection Prevention Layer 1105

It is more effective for the photosensitive body of the image forming apparatus for the charge injection prevention layer 1105 to be formed between the support body and the photoconductive layer since it can prevent the injection of charges from the support body.

Specifically, when the charge on the free surface of the photosensitive layer has a constant polarity, the charging injection prevention layer functions to prevent charges from the support body from being injected into the photoconductive layer. But when the charge on the free surface of the photosensitive layer has the opposite polarity, the above function is not performed. In other words, the charge injection prevention layer has a so-called polarity dependency. To obtain such a function, a greater number of atoms that control the conduction are contained in the charge injection prevention layer than in the photoconductive layer.

The atoms that control the conduction may be uniformly distributed in the layer, or may partially be distributed nonuniformly while they are arranged evenly in the direction of the thickness of the layer. When the distribution density is uneven, preferably more of these atoms are distributed near the support body.

However, in either case, it is necessary for the content of the atoms to be even, with a uniform distribution extending toward the surface of the support body and toward the parallel planes, so that along the planes a uniform property is obtained.

So-called impurities in the semiconductor field can be employed as the atoms that are contained in the charge injection prevention layer 1105 to control conduction. Such impurities can be atoms that belong to the III group in the periodic table, for providing the p-type conductive property, or atoms that belong to the V group in the periodic table, for providing the n-type conductive property.

The atom content in the charge injection prevention layer required for controlling conduction can be appropriately determined so as to effectively achieve that objective.

Further, when at the least either carbon atoms, nitrogen atoms or oxygen atoms are contained in the charge injection prevention layer, contact between the charge injection prevention layer and another layer that is formed directly thereon can be increased.

The carbon atoms, the nitrogen atoms or the oxygen atoms may be uniformly distributed in the layer, or they may partially be distributed nonuniformly while they are evenly arranged toward the thickness of the layer. In either case, however, it is necessary for the atoms to be arranged evenly with a uniform distribution extending toward the surface of the support body and toward the parallel planes, so that along the planes a uniform property is obtained.

The carbon atoms and/or nitrogen atoms and/or oxygen atoms that are contained in the charge injection prevention layer 1105 can be appropriately determined so as to effectively achieve that objective.

Further, the hydrogen atoms and/or halogen atoms that are contained in the charge injection prevention layer can effectively compensate for the nonbonding portions present in the layer and thus enhance the film quality.

While taking into account the acquisition of a desired electrophotographic property and the economic effects, the thickness of the charge injection prevention layer is preferably 0.1 to 5 $\mu$m, more preferably, 0.3 to 4 $\mu$m, and optimally, 0.5 to 3 $\mu$m.

The same vacuum deposition method used for forming the photoconductive layer is also employed to form the charge injection prevention layer 1105.

Furthermore, for the photosensitive body of the image forming apparatus, it is preferable that an area wherein, at the least, aluminum atoms, silicon atoms and hydrogen atoms and/or halogen atoms are distributed evenly toward the thickness of the layer be provided near the support body 1101 of the photosensitive layer 1102.

Also, for the photosensitive body, a close contact layer may be formed of an amorphous material that employs, as its primary element, $Si_3N_4$, $SiO_2$, SiO or silicon atoms, and that contains hydrogen atoms and/or halogen atoms, and carbon atoms and/or oxygen atoms and/or nitrogen atoms, so that the contact between the support body 1101 and the photoconductive layer 1103 or the charge injection prevention layer 1105 is further improved.

Moreover, as previously described, a light absorption layer may be formed to prevent the occurrence of a coherent pattern due to the light reflected by the support body.

(E) Manufacturing Apparatus

Figure 19:
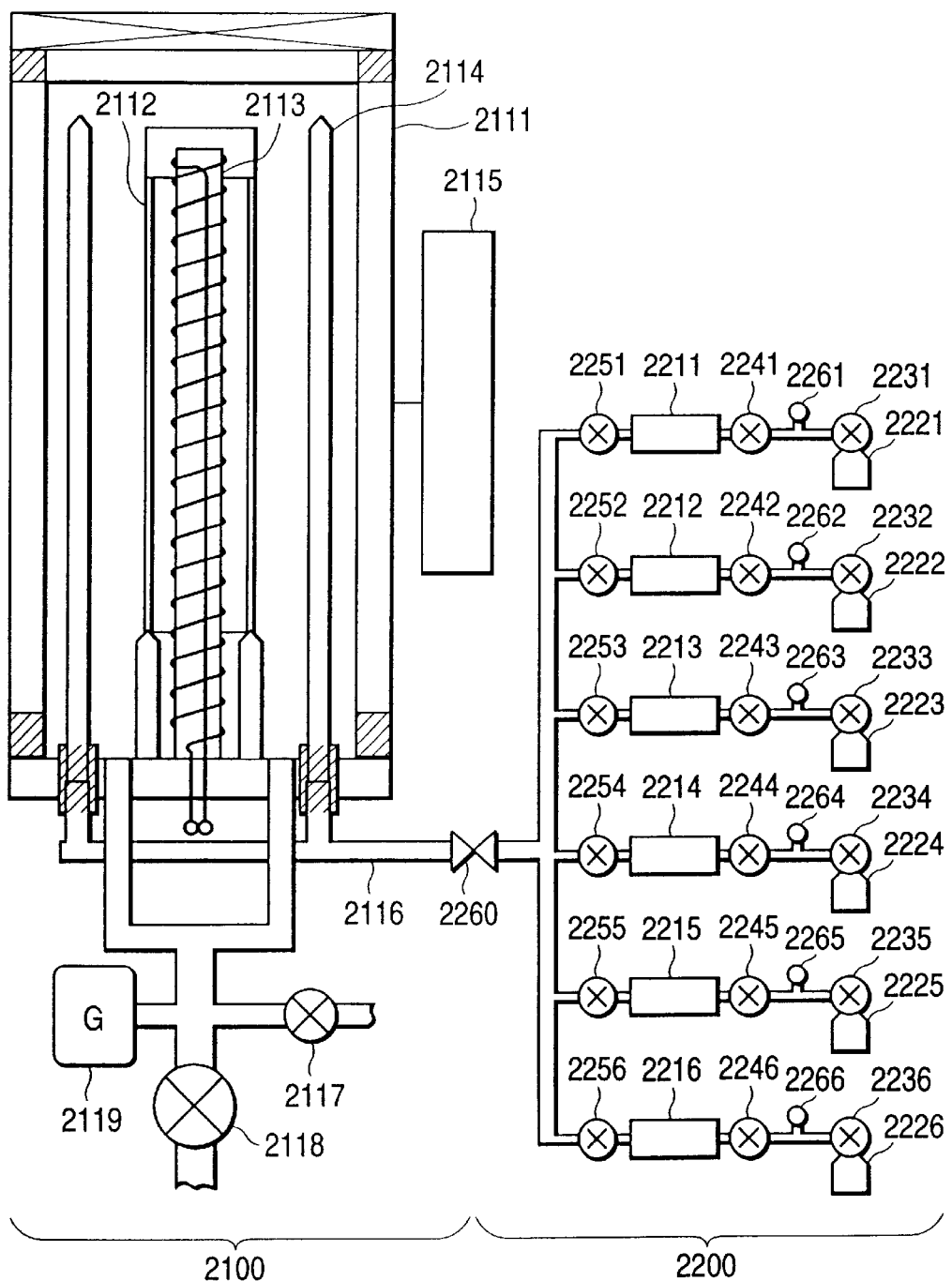
FIG. 19 is a diagram showing an example RF-PCVD apparatus.

The above described photosensitive body is fabricated using a well known CVD apparatus. FIG. 19 is a diagram showing an example apparatus that performs the high frequency plasma CVD method (hereafter referred to as the "RF-PCVD") that employs a RF band.

This apparatus comprises a deposition device 2100, a material gas supplying device 2200, and an air exhaust device (not shown) for reducing the pressure in a reaction container 2111.

A cylindrical support body 2112, a support body heater 2113 and a material gas introduction pipe 2114 are located in the reaction container 2111 of the deposition device 2100, and a high frequency matching box 2115 is connected to the reaction container 2111.

The material gas supply device 2200 includes cylinders 2221 to 2226 for material gases, such as $SiH_4$, $H_2$, $CH_4$, $B_2H_6$ and $PH_3$; corresponding valves 2231 to 2236, 2241 to 2246 and 2251 to 2256; and mass flow controllers 2211 to 2216. The cylinders containing the individual material gases are connected via a valve 2260 to the gas introduction pipe 2114 of the reaction container 2111.

Figure 20:
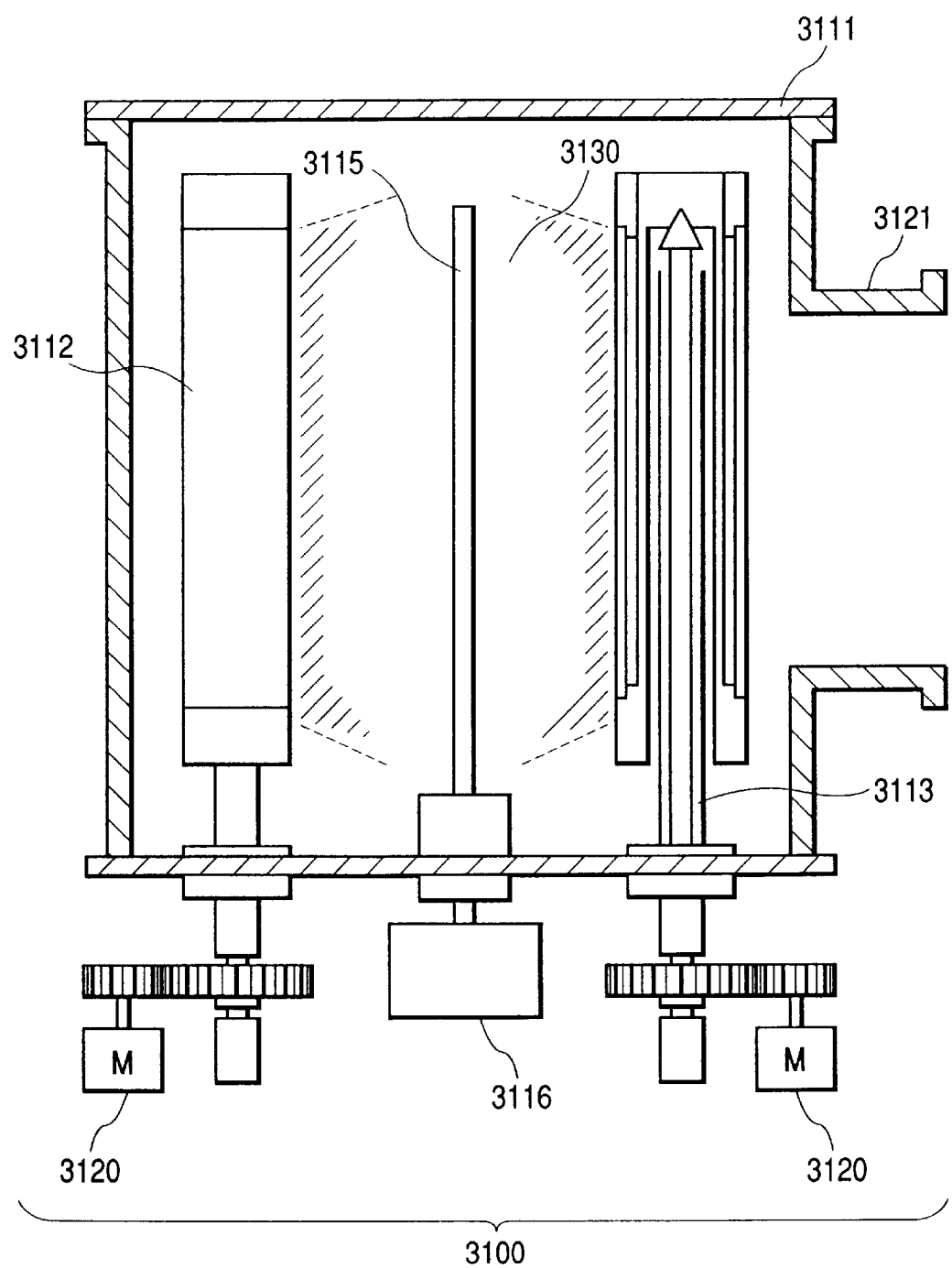
FIG. 20 is a diagram showing an example VHF-PCVD apparatus.
Figure 21:
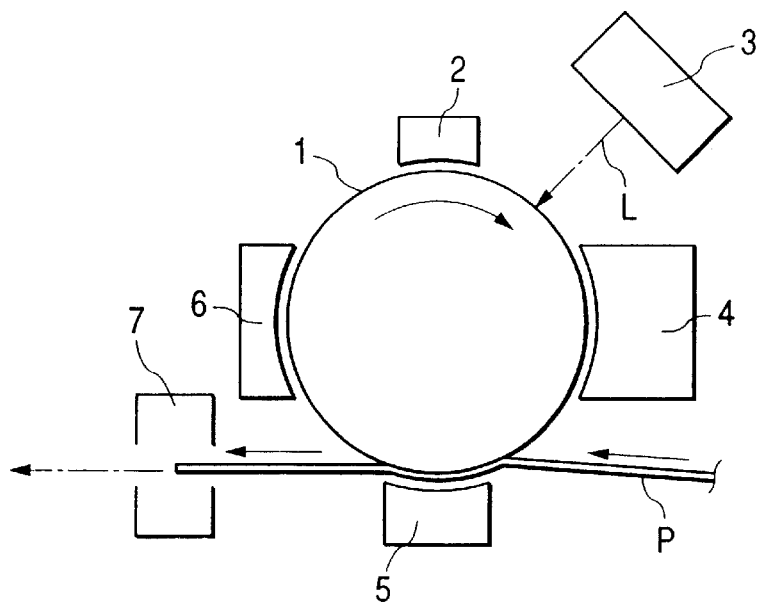
FIG. 21 is a schematic diagram illustrating an example arrangement for an electrophotographic apparatus.
Figure 22:
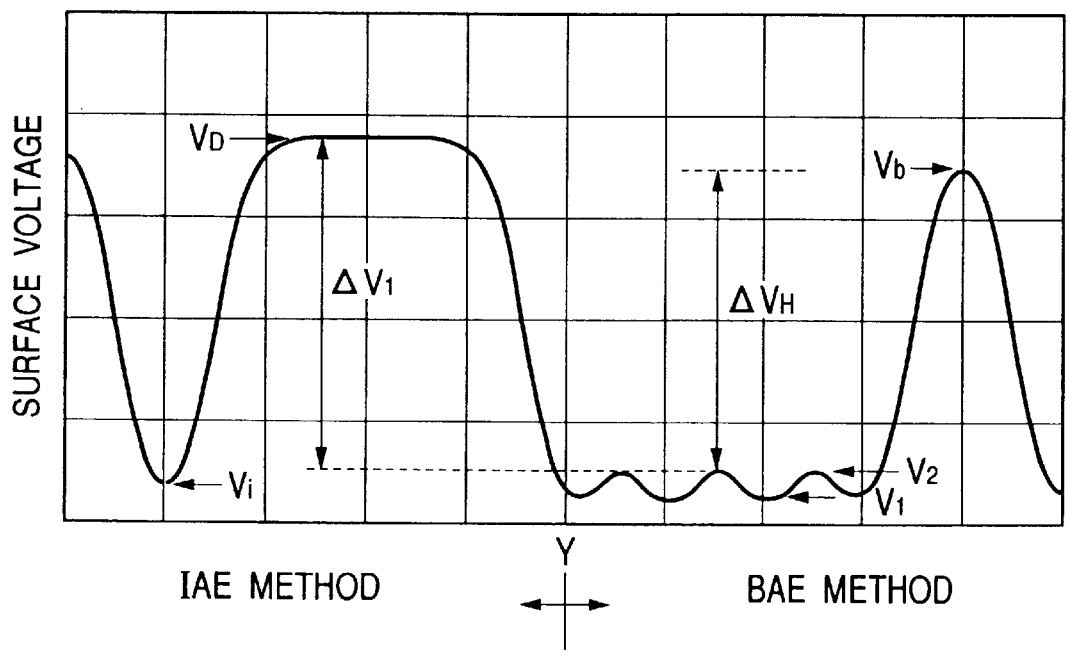
FIG. 22 is a graph showing the models of latent images for one line according to the IAE method and the BAE method.
Figure 23:
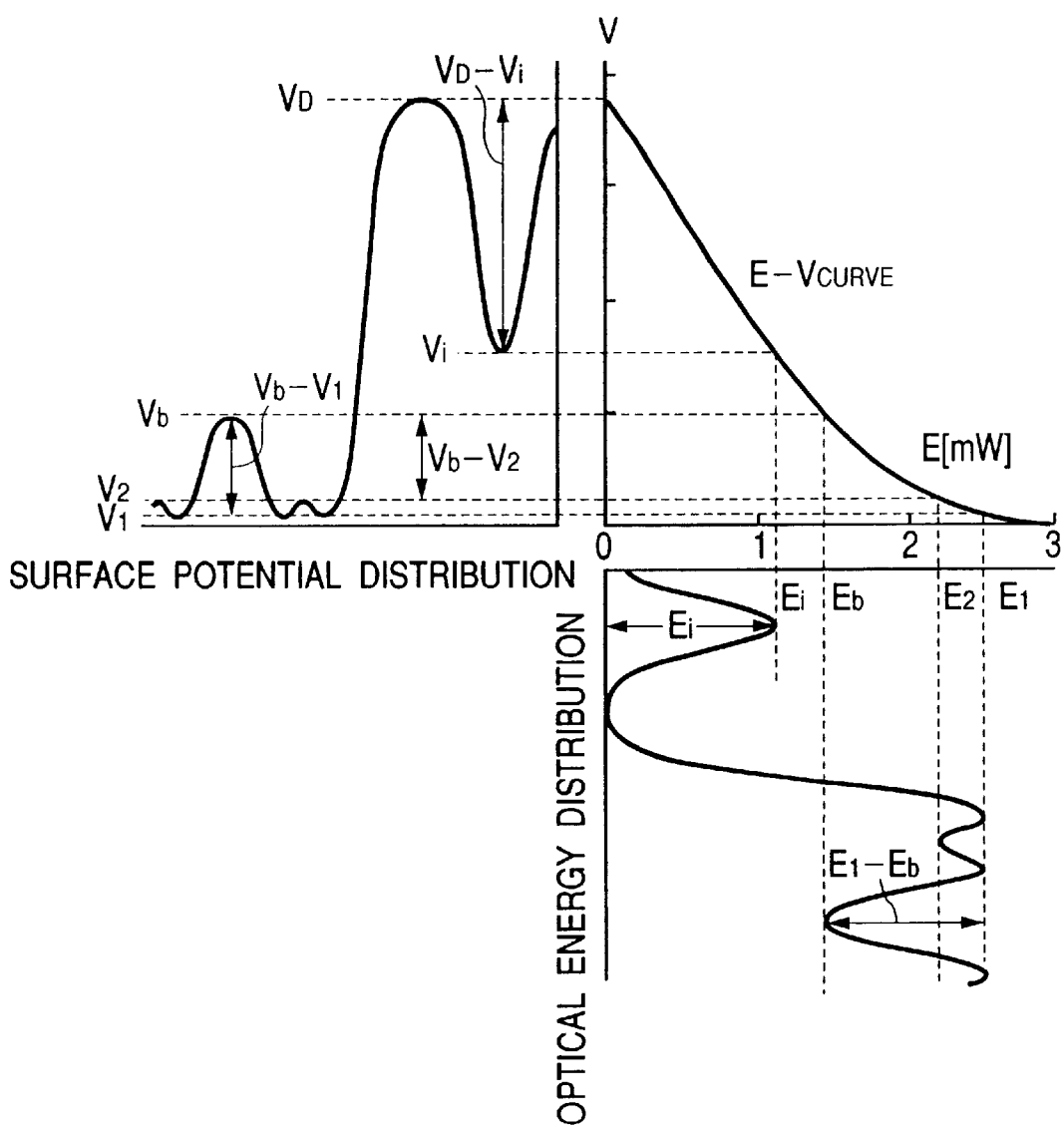
FIG. 23 is a graph showing the relationship between the optical energy distribution, the EV characteristic of the photosensitive body and the surface potential distribution.

FIG. 20 is a diagram showing an example apparatus that performs the high frequency plasma CVD method (hereinafter referred to as the "VHF-PCVD") using the VHF band.

This manufacturing apparatus, which uses the VHF-PVCD method, is so designed that the deposition device 2100 in FIG. 19 is replaced with a deposition device 3100 in FIG. 20, and the deposition device 3100 is connected to the material gas supply device 2200.

Roughly, this apparatus comprises: a reaction container 3111 having a airtight vacuum structure, wherein the pressure can be reduced; the material gas supplying device 2200 (FIG. 19); and an air exhaust device (not shown) for reducing the pressure in the reaction container 3111.

A cylindrical support body 3112, a support body heater 3113, a material gas introduction pipe 3114 and an electrode are located inside the reaction container 3111, and a high frequency matching box 3120 is connected to the electrode. Further, the reaction container 3111 is connected to a diffusion pump (not shown) via an air exhaust pipe 3112, and a space 3130 enclosed by the cylindrical support body 3112 serves as a discharge space.

Relative to sensitivity, according to the principle of carrier transmission, generally the amorphous photosensitive body does not have a field dependency and the EV property has a linear shape, as is shown in FIG. 18, so that an optical energy change is not easily reflected onto the potential. Therefore, the optical energy distribution and the potential distribution are both Gaussian distributions. Thus, when the bottom of the optical distribution is changed, the size of the dot diameter is comparatively little affected, and the image quality is seldom deteriorated. In addition, since abrasion due to endurance is not required, the change in the sensitivity, i.e., the endurance change of the EV property, is small, and a problem that has arisen for the OPC that is associated with abrasion does not occur.

<Developer>

The developer mainly consists of resin particles that contain a coloring agent and an outward additive, and preferably, the outward additive consists of fine inorganic particles. The fine inorganic particles are employed for the outward additive because these particles are not easily affected by the environment, and do not deteriorate the flowability of toner, even at a high temperature and a high humidity, so that the preservative property of the toner is not degraded.

For a black coloring agent, carbon black, magnetic powder, and the yellow, magenta and cyan coloring agents listed below are employed to adjust the color to obtain black.

For a yellow coloring agent, a condensed azo compound, an iso-indolinone compound, an anthraquione compound, an azo metal complex, a methine compound or an allyl amido compound is employed.

Specifically, C.I. pigment yellow 12, 13, 14, 15, 17, 62, 74, 83, 93, 94, 95, 97, 109, 110, 111, 120, 127, 128, 129, 147, 168, 174, 176, 180, 181 or 191 is preferably employed.

For a magenta coloring agent, a condensed azo compound, a diketopyrrolopyrrole compound, an anthraquione compound, a quinacridon compound, a basic dye lake compound, a naphthol compound, a benzimidazolone compound, a thioindigo compound or a perylene compound is employed.

Specifically, C.I. pigment red 2, 3, 5, 6, 7, 23, 48:2, 48:3, 48:4, 57:1, 81:1, 144, 146, 166, 169, 177, 184, 185, 202, 206, 220, 221 or 254 is particularly preferable.

For a cyan coloring agent, a copper phthalocyanine compound and its derivative, an anthraquione compound, or a basic dye lake compound can be employed.

Specifically, C.I. pigment blue-1, 7, 15, 15:1, 15:2, 15:3, 15:4, 60, 62 and 66 can be preferably employed.

These coloring agents can be used independently or can be mixed, or can be used as a solid solution.

A coloring agent is selected while taking into account the color phase angle, the color saturation, the brightness, the weather resistance, the OHP transmission property, and the property for dispersion through the toner. When mixed, 1 to 20 parts of coloring agent by mass are added to 100 parts of resin by mass.

When a magnetic powder is employed as the black coloring agent, unlike the other coloring agents, 30 to 200 parts by mass of the magnetic powder are added to 100 parts of resin by mass.

The magnetic powder is a metal oxide including elements, for example, of iron, cobalt, nickel, copper, magnesium, manganese, aluminum or silicon. A metal oxide in which iron oxide, such as triiron tetroxide or γ-iron oxide, is contained is especially preferable as the primary element.

Further, while taking toner charging control into account, other metal elements, such as silicon elements or aluminum elements, may be included.

For these magnetic powder particles, the BET specific surface area measurement acquired using the nitrogen absorption method is preferably 2 to 3 $m^2/g$, with 3 to 28 $m^2/g$ being particularly preferable, and the Mohs' hardness is preferably 5 to 7.

The magnetic powder can be shaped like an octahedron, a hexahedron, a spheroid, a needle or a scale; however, an octahedron, a hexahedron, a spheroid or a less anisotropic, indeterminate shape is preferable and increases image density.

The average particle diameter of the magnetic powder is preferably 0.05 to 1.0 $\mu$m, more preferably, 0.1 to 0.6 $\mu$m, and optimally, 0.1 to 0.4 $\mu$m.

The amount of magnetic powder contained in 100 parts by mass of binder resin is preferably 30 to 200 parts by mass, more preferably, 40 to 200 parts by mass, and optimally 50 to 150 parts by mass. When the magnetic powder is less than 30 parts by mass, the toner carrying property is insufficient for a developing device that employs magnetic force to carry toner, and an uneven image will tend to be generated on the developer layer on the developer carrying body. Further, the image density tends to be reduced due to the rise in triboelectricity in the developer. When the magnetic powder exceeds 200 parts by mass, a fixing property problem arises.

A well known outward additive can be employed, however, to improve the charging stability, the developing property, the flowability and the preservative property. As this additive, an inorganic fine powder, such as silica, alumina or titania, or a double oxide thereof is preferable, and silica is even more preferable. The silica can be either dry silica or so-called fumed silica, which is generated by performing a drying process for vapor phase oxidization of a halogen silicon compound or alkoxide, or so-called wet silica, which is produced from alkoxide and water glass. Dry silica, however, is more preferable because only a small amount of the silanol group is present on the surface and in the fine silica powder, and after production, there is little $Na_2O$ or $SO_3^{2-}$ residue remaining. Further, when a metal halogen compound, such as aluminum chloride or titanium chloride, is employed with a silicon halogen compound during the production process, a composite powder consisting of the dry silica and the other metal oxide can be obtained. This magnetic powder is also included for the outward additive.

Satisfactory results can be obtained by using a fine inorganic powder for which the BET specific surface area measurement acquired using the nitrogen absorption method falls 30 $m^2/g$ or more, specifically, 50 to 400 $m^2/g$. The fine silica powder of 0.1 to 8 parts by mass, but preferably, 0.5 to 5 parts by mass, or more preferably, 1.0 up to 3.0 parts by mass, should be added to 100 parts by mass of the toner.

In addition, it is preferable that, for hydrophobic or charging control, the fine inorganic powder be processed, as needed, by a treating agent, such as silicone varnish, silicone oil, various types of degenerated silicone oil, a silan coupling agent, a silan coupling agent including a functional group, another organic silicon compound or an organic titanium compound, or by a combination of these treating agents.

In this embodiment, the specific surface area measurement device Autosoap 1 (Yuasa Ionics Co., Ltd.) was employed to attach the nitrogen gas to the surface of a sample, and the specific surface area was calculated using the BET multi-point method.

In order to maintain the stable preservative property of the toner, it is preferable that the fine inorganic powder at least be treated using silicon oil.

An outward additive, other than fine silica powder, may be added to the magnetic toner, as needed. Such an outward additive is, for example, fine resin powder or fine inorganic powder that serves as an auxiliary charging agent, a conductivity applying agent, a flowability applying agent, a caking prevention agent, a releasing agent for the fixing process using a thermal roll, a slip additive, or an abrasive.

It is preferable that the average particle diameter of the fine resin powder be 0.03 to 1 $\mu$m. A polymerized monomer that is used to form the resin is: a styrene monomer, such as styrene, o-methylstyrene, m-methylstyrene, p-methylstyrene, p-methoxystyrene or p-ethylstyrene; methacrylic acids, such as acrylate and methacrylate; an acrylic ester, such as methylacrylate, ethylacrylate, n-butylacrylate, isobutylacrylate, n-propyl acrylate, n-octyl acrylate, dodecylacrylate, 2-ethylhexyl acrylate, stearylacrylate, 2-chlorethyl acrylate or phenylacrylate; a methacrylic ester, such as methylmethacrylate, ethylmethacrylate, n-propyl methacrylate, n-butyl methacrylate, isobutyl methacrylate, n-octyl methacrylate, dodecylmethacrylate, 2-ethylhexyl methacrylate, stearyl methacrylate, phenylmethacrylate, dimethylamlnoethyl methacrylate or dlethylaminoethyl methacrylate; or a monomer, such as acrylonitrile, methacrylonitrile or acrylamido.

Suspension polymerization, emulsion polymerization, or soap free polymerization can be employed as the polymerization method; however, particles obtained using soap free polymerization are preferable.

It has been confirmed that fine resin powder that has the above feature provides particularly great effects during drum fusion performed for a contact charging system, such as a roller, a brush or a blade, that serves as the primary charging device.

For the fine inorganic particles, a slip additive such as Teflon, zinc stearate or polyvinyliden fluoride, is preferable, with polyvinyliden fluoride being especially preferable. Or an abrasive such as cerium oxide, silicon carbide or strontium titanate, is preferable, with strontium titanate being particularly preferable. Or a flowability applying agent such as titanium oxide or aluminum oxide is preferable, with a hydrophobic agent being particularly preferable. Further, a small amount of a caking prevention agent, conductivity applying agent, such as carbon black, zinc oxide, antimony oxide or tin oxide, or a fine white powder or a fine black powder having the opposite polarity can be employed as a development enhancing agent.

Furthermore, the charge control agent may be mixed with toner particles, or may be added to toner particles. With the charge control agent, the optimal charge control can be exercised in accordance with the developing system, and particularly in this invention, the balance between particle distribution and charge quantities can be further stabilized.

The following material is used to maintain a toner having a negative charge.

An organic metal complex or a chelate compound, for example, is effective, as is a metal complex such as, for example, a monoazo metal complex, an acetylacetone metal complex, or a metal complex of aromatic hydroxycarboxylic acid or aromatic dicarbonic acid. In addition, also available are aromatic hydroxycarbonic acid, aromatic monocarbonic and polycarbonic acid and a metallic salt thereof, an anhydrous material, an ester, and a phenol derivative, such as bisphenol.

Further, the following materials can be used independently, or a combination of two or more can be used to maintain a toner having a positive charge:

a degenerated material, such as nigrosin and fatty metallic salt; a quaternary ammonium salt, such as tributyl benzilammonium-1-hydrixy-4-naphthosulfonate or tetrabutylammonium tetrafluoroborate; an onium salt, such as phosphonium salt, which is a similar material, and lake pigments thereof; a triphenylmethane dye and its lake pigment (phosphotungstate, phosphomolybate, phosphotungstic molybdate, tannic acid, lauric acid, gallic acid, a ferricyanide compound or a ferrocyanide compound is employed as a laking agent); a metallic salt of a higher fatty acid; a diorgano tin oxide, such as dibutyl tin oxide, dioctyl tin oxide or dicyclohexyl oxide; or a diorgano tinborate, such as dibutyl tinborate, dioctyl tinborate or dicyclohexyl tinborate.

It is preferable that the above charge control agent be used as fine powder. In this case, the average particle diameter of the charge control agent should be equal to or smaller than 4 $\mu$m, and preferably equal to or smaller than 3 $\mu$m. When the charge control agent is to be mixed with the toner, it is preferable that a control agent of 0.1 to 20 parts by mass, specifically of 0.2 to 10 parts by mass, be used with 100 parts by mass of binder resin.

Well known methods are employed to prepare toner. As one example preferable method, a pigment, a dye or magnetic powder that is used as a binder resin or a coloring agent, wax if necessary, a metallic salt or a metal complex, a charge control agent and other additives are mixed together in a mixer, such as a henshel mixer or a ball mill. The obtained mixture is then melted and kneaded using a heat kneader, such as a heat roll or an extruder. Then, a coloring agent and, as needed, a metal compound, a pigment or a dye are dispersed or melted into the resins that have now been rendered compatible, and the resultant mixture is solidified by cooling and is thereafter pulverized. Following this, the classification and surface process is performed as needed to obtain toner particles. Thereafter, inorganic fine powder is added as needed, and finally the toner is obtained.

In order to achieve a specific circular distribution and particle distribution of the toner, the mixture may be merely pulverized (and classified as needed) by a well known pulverizer, such as a mechanical impact or a jet pulverizer. To obtain a sharper circular distribution, it is preferable that the resin mixture be pulverized by heating, and further that mechanical impact be applied to the resultant material.

In addition, a method for dispersing the fine toner particles that have been pulverized (and classified as needed) in hot water, or a method for passing the toner particles through a hot air stream may be employed. The method for performing a process using mechanical impact is the most preferable when taking into account the reduction in the charges held by the toner, the transfer property and the other image properties, and the productivity.

The means for applying mechanical impact is, for example, a method for which is used a mechanical impact type pulverizer, such as a cryptoron system produced by Kawasaki Heavy Industries, Ltd. or a turbo mill produced by Turbo Industries, Ltd., or a method for using an apparatus, such as a mechanofusion system produced by Hosokawa Micron Co., Ltd. or a hybridization system produced by Nara Machinery Co., Ltd., that employs the centrifugal force of a rapidly rotating blade to push toner inside a casing, and that exerts mechanical impact on the toner by using compression and friction. Specifically, according to one preferable method, a mechanical impact type apparatus (produced by Turbo Industries, Ltd.) disclosed in Japanese Patent Publication No. 42-27021 (see FIG. 9) is employed. The rotor 114 is rotated in an atmosphere of 35° C. or higher at a peripheral blade 121 speed of 60 to 150 m/sec, and the circular distribution and the particle distribution are adjusted while the toner is pulverized. According to another preferable method, in addition to the above method, a surface process is performed during which mechanical impact is applied.

It is especially preferable that the process for exerting the mechanical impact be performed after the toner pulverization process, or after the succeeding classification process, because the occurrence of a smearing image trailing edge is prevented and the preservative property of the toner is improved.

Either the classification process or the surface process may be performed first, and it is preferable that the multi-fraction classification device be employed for the classification process to improve the production efficiency.

<Fur Brush Member>

A fur brush member, which is the cleaning element used for a fur brush cleaning device, is generally formed of: an assemblage of fibers wherein a resin, such as rayon, nylon, acryl, polyester or polyimido, is employed as the main element and hydrotalcite $(Mg_2Al_2(OH)_{16}CO_3 \cdot 4H_2O)$ is mixed in as needed; an assemblage of fibers wherein a resin, such as rayon, nylon, acryl, polyester or polyimido, is employed as the main element, and carbon particles, metal powder or a phenol resin are carbonated; or an assemblage of artificial conductive fibers wherein a conductive material, such as a stainless fiber, is dispersed and the hydrator is mixed as needed.

The artificial fiber is obtained by extracting, through nozzles, a resin liquid in which an appropriate amount of carbon particles are dispersed. The conductive fiber may be grounded or a direct current bias may be applied to it. The volume resistance of the artificial fiber can be arbitrarily selected by changing the amount of dispersed carbon particles. The thickness and the shape in cross section of the artificial fiber can be changed as needed in accordance with the diameter and the shape of the nozzle. An appropriate fiber is 3 to 50 deniers ($0.33 \times 10^{-6}$ to $5.56 \times 10^{-6}$ kg/m), and an appropriate density is 40000 to 100000/inch$^2$ (25.8 to 65.4/m$^2$).

A cylindrical brush is formed of these fibers with one end of each fiber being securely glued using a conducive adhesive, and wound around a support shaft prepared by plating a copper bar. When the developer has a negative charge, it is preferable that the fiber be one that is easily charged to the negative polarity, such as urethane resin, silicon resin, polyester resin fluorine resin (e.g., Teflon resin), or polyimido resin. When the developer is positive, it is preferable that the brush material be one that is easily changed to the positive polarity, such as urethane resin, polyamide or nylon. Further, to adjust the conduction of the developer, it is preferable that the fiber contain a metal oxide, such as silica, alumina, titania, tin oxide, zirconia or zinc oxide, carbon black, and the charge control agent that is generally used for the developer.

Furthermore, to remove ozone generation material on the surface of the photosensitive body, a fiber mized with a powdered interlayer compound, such as hydrogencarbonate mineral, having a Moh's hardness (10 levels) of 1.5 to 3.0 and Ph 8.0 to 10.0, is employed for the fur brush. Thus, the substance attached to the surface can be effectively removed, and the interlayer compound performs an anionic exchange between nitric ions and carbonic ions, so that the nitric ions are rendered harmless and smearing of an image is eliminated. The interlayer compound is preferably hydrotalc $(Mg_2R_2(OH)_{16}CO_3 \cdot 4H_2O)$ (R=Al, Cr, Fe), and more preferably, hydrotalcite.

In Japanese Patent Application Laid-Open No. 5-181398, the anionic exchange fiber is employed for the fur brush, however, there is no description of the effects provided for an a-C:H,X surface layer and the effects inherent to the inter-layer compound (hydrotalcite).

What is claimed is:

1. An electrophotographic apparatus comprising:
    a photosensitive body;
    electrostatic image forming means for forming an electrostatic image on said photosensitive body, said electrostatic image forming means including exposing means for exposing said photosensitive body by a digital light in accordance with image information, and said exposing means exposing a portion that is a background for an image; and
    developing means for developing said electrostatic image using a developer, wherein rate throughout the developer of contained particles having a diameter equal to or smaller than 1 $\mu$m is 5 to 40 number %,
    wherein, when A denotes a one-pixel width and Wv denotes a width at a half value of a peak in a potential distribution of said electrostatic image formed by exposing said photosensitive body using the digital light of one pixel,
    $0.6 \leq Wv/A \leq 1.0$ is satisfied.

2. An electrophotographic apparatus according to claim 1, wherein an average particle diameter of said developer is 4 to 13 $\mu$m.

3. An electrophotographic apparatus according to claim 1 or 2, wherein the rate throughout the developer of the contained particles having a diameter of 1 to 3 $\mu$m is 2 to 30 number %.

4. An electrophotographic apparatus according to claim 1, wherein the digital light is a laser beam.

5. An electrophotographic apparatus according to claim 1, wherein the digital light is an LED beam.

6. An electrophotographic apparatus according to claim 1, wherein the one-pixel width on the surface of said photosensitive body is equal to or smaller than 80 $\mu$m.

7. An electrophotographic apparatus according to claim 1, further comprising a cleaning member for contacting said photosensitive body to clean said photosensitive body.

8. An electrophotographic apparatus according to claim 7, wherein said cleaning member is a blade.

9. An electrophotographic apparatus according to claim 7, wherein said cleaning member is a brush.

10. An electrophotographic apparatus comprising:
    a photosensitive body, said photosensitive body including an amorphous silicon photosensitive layer;
    electrostatic image forming means for forming an electrostatic image on said photosensitive body, said electrostatic image forming means including light exposing means for exposing said photosensitive body by a digital light in accordance with image information, and said exposing means exposing a portion that is a background for an image; and
    developing means for developing said electrostatic image using a developer, wherein rate throughout the developer of contained particles having a diameter equal to or smaller than 1 $\mu$m is 5 to 40 number %,
    wherein, when A denotes a one-pixel width and Wv denotes a width at a half value of a peak in a potential distribution of said electrostatic image formed by exposing said photosensitive body using the digital light of one pixel, $0.6 \leq Wv/A \leq 1.0$ is satisfied.

11. An electrophotographic apparatus according to claim 10, wherein an average particle diameter of said developer is 4 to 13 µm.

12. An electrophotographic apparatus according to claim 10 or 11, wherein the rate throughout the developer of the contained particles having a diameter of 1 to 3 µm is 2 to 30 number %.

13. An electrophotographic apparatus according to claim 10, wherein the digital light is a laser beam.

14. An electrophotographic apparatus according to claim 10, wherein the digital light is an LED beam.

15. An electrophotographic apparatus according to claim 10, wherein the one-pixel width on the surface of said photosensitive body is equal to or smaller than 80 µm.

16. An electrophotographic apparatus according to claim 10, further comprising a cleaning member for contacting said photosensitive body to clean said photosensitive body.

17. An electrophotographic apparatus according to claim 16, wherein said cleaning member is a blade.

18. An electrophotographic apparatus according to claim 16, wherein said cleaning member is a brush.

* * * * *

UNITED STATES PATENT AND TRADEMARK OFFICE
CERTIFICATE OF CORRECTION

PATENT NO. : 6,333,755 B1
DATED : December 25, 2001
INVENTOR(S) : Toshiyuki Ehara et al.

It is certified that error appears in the above-identified patent and that said Letters Patent is hereby corrected as shown below:

Title page,
Item [57], ABSTRACT,
Line 10, "have" should read -- having --.

Column 4,
Line 11, "interval in" should read -- interval. In --.

Column 6,
Line 56, "hav-" should be deleted; and
Line 57, "ing" should be deleted.

Column 7,
Line 31, "quality" should read -- quality --.

Column 8,
Line 25, "Image" should read -- image --.

Column 9,
Line 64, "medical" should read -- Medical --.

Column 10,
Line 45, "information" should read -- information. --; and
Line 48, "when" should read -- When --.

Column 12,
Line 44, "is" should be deleted; and
Line 61, "the a" should read -- the --.

Column 13,
Line 5, "the a" should read -- a --;
Line 10, "in the" should be deleted;
Line 11, "the ratio" should read -- a ratio --;
Line 15, "1 μ" should read -- 1 μm --; and
Line 31, "to the" should read -- to --.

Column 14,
Line 33, "are" should be deleted.

UNITED STATES PATENT AND TRADEMARK OFFICE
CERTIFICATE OF CORRECTION

PATENT NO.    : 6,333,755 B1
DATED         : December 25, 2001
INVENTOR(S)   : Toshiyuki Ehara et al.

It is certified that error appears in the above-identified patent and that said Letters Patent is hereby corrected as shown below:

Column 15,
Line 21, "a image" should read -- an image --; and
Line 67, "in herein" should read -- wherein --.

Column 16,
Line 21, "proper," should read -- property, --; and
Line 22, "rants" should read -- ranks --.

Column 17,
Line 1, "scanning," should read -- scanning --.

Column 19,
Line 57, "of a" should read -- a --.

Column 20,
Line 62, "generate of no pollution" should read -- no pollution was generated --; and
Line 63, "an" should read -- a --.

Column 22,
Line 22, "general" should read -- a general --.

Column 23,
Line 24, "CVD" (second occurrence) should read -- CVD. --; and
Line 53, "is" should read -- Is --.

Column 24,
Line 8, "gasificated" should read -- gasified --.

Column 25,
Line 55, "apparatus" should read -- apparatus. --.

Column 26,
Line 1, "are is" should read -- are --.

Column 27,
Line 3, "affect" should read -- effect --; and
Line 7, "same of" should read -- same characteristic of --.

UNITED STATES PATENT AND TRADEMARK OFFICE
CERTIFICATE OF CORRECTION

PATENT NO. : 6,333,755 B1
DATED : December 25, 2001
INVENTOR(S) : Toshiyuki Ehara et al.

It is certified that error appears in the above-identified patent and that said Letters Patent is hereby corrected as shown below:

Column 28,
Line 62, "a airtight" should read -- an airtight --.

Column 29,
Line 52, "blue-1," should read -- blue 1, --.

Column 30,
Line 44, "$SO_3^{2-}$" should read -- $SO_3^{-2}$ --.

Column 31,
Line 26, "dimethylamlnoethyl" should read -- dimethylaminoethyl --.

Column 32,
Line 6, "hydrixy" should read -- hydroxy --.

Column 34,
Line 6, "brush," should read -- brush; --;
Line 21, "rate" should read -- the rate --; and
Line 63, "rate" should read -- the rate --.

Signed and Sealed this

Eleventh Day of March, 2003

JAMES E. ROGAN
*Director of the United States Patent and Trademark Office*